United States Patent
Liu et al.

(10) Patent No.: US 9,686,505 B2
(45) Date of Patent: Jun. 20, 2017

(54) METHOD FOR FLICKER DETECTION AND ASSOCIATED CIRCUIT

(71) Applicant: MediaTek Singapore Pte. Ltd., Singapore (SG)

(72) Inventors: Hsin-I Liu, Sunnyvale, CA (US); Dmitri Bitouk, Daly City, CA (US); Muge Wang, San Jose, CA (US)

(73) Assignee: MEDIATEK SINGAPORE PTE. LTD., Fusionopolis Walk (SG)

( * ) Notice: Subject to any disclaimer, the term of this patent is extended or adjusted under 35 U.S.C. 154(b) by 217 days.

(21) Appl. No.: 14/583,241

(22) Filed: Dec. 26, 2014

(65) Prior Publication Data

US 2015/0195487 A1    Jul. 9, 2015

Related U.S. Application Data

(60) Provisional application No. 61/923,390, filed on Jan. 3, 2014.

(51) Int. Cl.
   *H04N 7/01* (2006.01)
   *H04N 5/21* (2006.01)

(52) U.S. Cl.
   CPC ............ *H04N 7/0132* (2013.01); *H04N 5/21* (2013.01)

(58) Field of Classification Search
   CPC . H04N 5/2357; H04N 7/0132; H04N 13/0033
   USPC ........................................................ 348/447
   See application file for complete search history.

(56) References Cited

U.S. PATENT DOCUMENTS

| | | | |
|---|---|---|---|
| 6,710,818 B1 | 3/2004 | Kasahara et al. | |
| 7,538,799 B2 | 5/2009 | Yanof | |
| 8,092,506 B2 | 1/2012 | Haase et al. | |
| 2007/0109425 A1* | 5/2007 | Poplin | H04N 5/2357 348/226.1 |
| 2010/0123810 A1* | 5/2010 | Greenland | G03B 19/18 348/294 |

(Continued)

FOREIGN PATENT DOCUMENTS

| CN | 1292623 A | 4/2001 |
|---|---|---|
| CN | 1696812 A | 11/2005 |

OTHER PUBLICATIONS

SIPO Office Action dated Jul. 5, 2016 in Chinese application (No. 201510002287.6).

*Primary Examiner* — Michael Lee
(74) *Attorney, Agent, or Firm* — McClure, Qualey & Rodack, LLP

(57) ABSTRACT

A method for flicker detection based on a plurality of images and associated circuit is provided. The method includes providing an integrated flicker signal for each image, including accumulating pixel data of a number of pixels along each row; performing a motion compensation including: comparing two integrated flicker signals of two images, and accordingly providing a flicker signal difference; performing a flicker feature extraction including: applying a frequency analysis on the flicker signal difference, and accordingly providing a normalized flicker feature value; and performing a flicker determination, including: calculating a likelihood according to the normalized flicker feature value, and, according to the likelihood, determining whether a flicker-free hypothesis should be rejected in favor of a flicker-suffered hypothesis.

24 Claims, 12 Drawing Sheets

(56) References Cited

U.S. PATENT DOCUMENTS

2011/0255786 A1\* 10/2011 Hunter ..................... H04N 5/21
                                                        382/190
2013/0242198 A1\* 9/2013 Lee ........................ H04N 5/213
                                                        348/618

\* cited by examiner

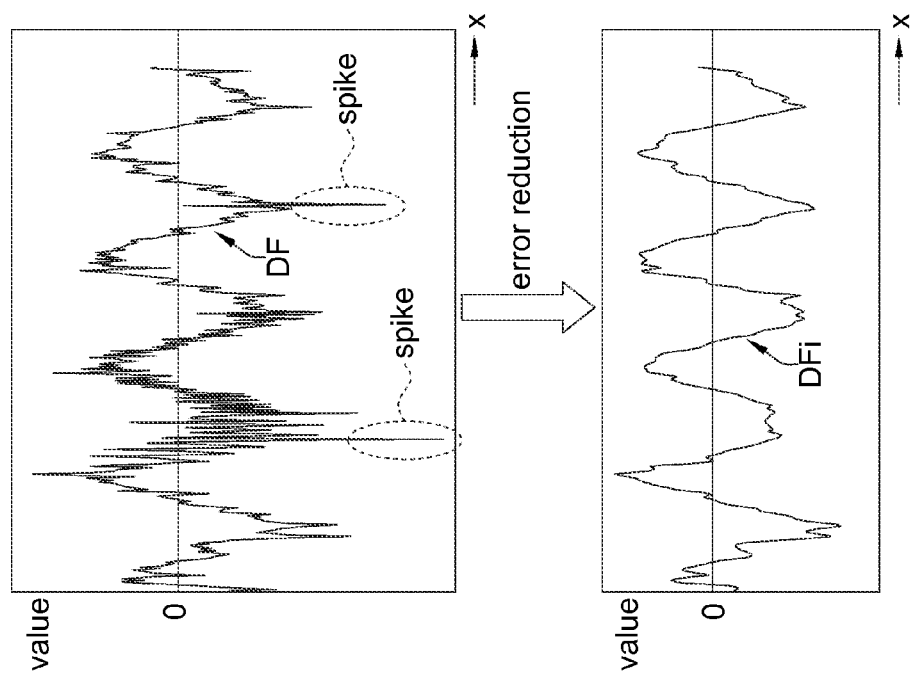

METHOD FOR FLICKER DETECTION AND ASSOCIATED CIRCUIT

This application claims the benefit of U.S. provisional Application Ser. No. 61/923,390, filed Jan. 3, 2014, the subject matter of which is incorporated herein by reference.

FIELD OF THE INVENTION

The invention relates to method for flicker detection and associated circuit, and, more particularly, to method for motion resilient detection of flickering artifact in digital images caused by power supply fluctuation, and associated circuit.

BACKGROUND OF THE INVENTION

Digital image system for photographing photos and/or filming videos has become an essential portion in modern electronic device, such as smart phone, mobile phone, handheld computer, portable computer, tabular computer, notebook computer, wearable gadget (e.g., glasses or watch), navigator, digital camera, network camera (e.g., IP camera), digital camcorder, game console, interactive toy and surveillance system, etc.

In modern digital image system, image acquisition is typically implemented by rolling shutter which controls exposure to an image sensor. The image sensor may include a plurality of pixel sensors arranged in an array; for pixel sensors arranged in a same line (e.g., a horizontal scan line, a row), light data picked up by each pixel sensor of the line may be sequentially read out during a readout interval. With rolling shutter mechanism, the readout intervals of different lines (rows) are arranged to happen sequentially, rather than concurrently, so the image sensor may be prevented from collecting excessive photons during each readout interval even though there is no physical light-shielding, and thus reduce cost of the image sensor. However, the rolling shutter also introduces a number of artifacts due to the sequential row (line) capturing and readout, and one of the artifacts is illumination flicker caused by fluctuating light source.

Therefore, there is a need for detecting and removing the illumination flicker noise of images.

SUMMARY OF THE INVENTION

An objective of the invention is to provide a method for flicker detection based on a plurality of images, e.g., sequentially captured frames. The method may comprise:
providing an exposure time according to maximizing, at a flicker frequency, a frequency response of exposure, and providing a frame rate according to maximization of an amplitude difference between a fluctuation waveform and a delayed fluctuation waveform which is delayed by a phase shift associated to an interval between two consecutive images;
causing the plurality of images to be captured at the frame rate, each image to be exposed with the exposure time;
providing an integrated flicker signal for each image, including: accumulating pixel data of a number of pixels of each image along a direction (e.g., row) of each image;
performing an intensity modulation on the integrated flicker signal of each image for reducing noise induced by an image sensor by which the images are captured;
performing an intensity compensating on the integrated flicker signal of each image for alleviating a variation between the images owing to auto exposure;
performing a motion estimation on two integrated flicker signals of two images, including: solving a minimization of a motion error formulated based on a weighted sum of absolute differences of the two integrated flicker signals, and accordingly providing a translational displacement;
performing a motion compensation, including: comparing the two integrated flicker signals of the two images by: aligning a first one of the two integrated flicker signal with a second one of the two integrated flicker signal according to the translational displacement, and, subtracting the aligned first integrated flicker signal with the second integrated flicker signal, and accordingly providing a flicker signal difference;
performing an error reduction on the flicker signal difference for removing spike noise introduced by error of the motion estimation, as well as high frequency noise in the flicker signal difference;
performing a flicker feature extraction, including: applying a frequency analysis based on the flicker signal difference at a number of sample frequencies, and accordingly providing a normalized flicker feature value; and
performing a flicker determination, including: according to the normalized flicker feature value, determining whether a flicker-free hypothesis should be rejected. For example, the flicker determination may include: calculating a likelihood according to the normalized flicker feature value, and, according to the likelihood, determining whether the flicker-free hypothesis should be rejected in favor of an alternative flicker-suffered hypothesis.

An objective of the invention is to provide a circuit for flicker detection based on a plurality of images. The circuit may include:
an exposure and frame rate control module, for providing a frame rate and an exposure time, and causing the plurality of images to be captured at the frame rate, each image to be exposed with the exposure time;
an integrated flicker signal calculation module for: providing an integrated flicker signal for each image, and performing an intensity modulation on the integrated flicker signal of each image;
an intensity compensation module for performing an intensity compensating on the integrated flicker signal of each image;
a motion estimation module for performing a motion estimation on two integrated flicker signals of two images, and accordingly providing a translational displacement;
a motion compensation module for performing a motion compensation, including: comparing the two integrated flicker signals of the two images, and accordingly providing a flicker signal difference;
a flicker feature extraction module for performing a flicker feature extraction on the flicker signal difference including: applying a frequency analysis on the flicker signal difference at a number of sample frequencies, and accordingly providing a normalized flicker feature value;
a frequency selection module for providing the number of sample frequencies;
a flicker determination module for performing a flicker determination, including:

obtaining a first set of probability emulation parameters for modeling a first conditional probability of occurrence of the normalized flicker feature value under a flicker-suffered hypothesis;

obtaining a second set of probability emulation parameters for modeling a second conditional probability of occurrence of the normalized flicker feature value under a flicker-free hypothesis;

calculating a logarithm of a ratio between the first conditional probability and the second conditional probability to accordingly provide a likelihood; and according to the likelihood, determining whether the flicker-free hypothesis should be rejected in favor of the flicker-suffered hypothesis; and an auto tuning module for providing the first set of probability emulation parameters and the second set of probability emulation parameters.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which:

FIG. 11 illustrates an example of error reduction; and

DETAILED DESCRIPTION OF PREFERRED EMBODIMENTS

Images are captured under ambient lights, and some of the mostly experienced ambient lights may suffer from fluctuating illumination intensity. For example, man-made light sources which drain AC (alternating current) power may produce lights of fluctuating intensity. With fluctuating light source, such as the fluorescent light used in indoor illumination, different rows (lines) of the image sensor are exposed under different illumination intensity due to sequential row capturing and readout, resulting in a banding effect, e.g., a flicker artifact, in the captured image to degrade quality of the image. To suppress or eliminate the banding effect, exposure time of each line may be set to equal a multiple of a fluctuation period (a temporal period at which the intensity fluctuates), so each line of the image sensor may be exposed to same amount of photons during the exposure time. To this end, it is important to detect a frequency of flicker (flicker frequency, e.g., a reciprocal of the fluctuation period), so the exposure time may be set (selected) accordingly.

The flicker frequency of the fluorescent light may correspond to a frequency of an alternating current at power supply. With the magnetic ballast, the flicker frequency may be twice of the power supply frequency, as the ballast may fire of on both positive and negative voltage differences. If the flicker frequency is determined, the digital image system may change its exposure table (e.g., AE table, with AE representing auto exposure) as needed. More specifically, if it is detected that there is a 120 Hz flicker, an image system may apply an exposure table for 60 Hz AC powered light (with exposure time equal to a multiple of 8.33 ms) while still being responsive to 100 Hz flicker, and vice versa; e.g., if a 100 Hz flicker is detected, the image system may switch to the exposure table for 50 Hz AC powered light (with exposure time equal to a multiple of 10 ms), and keep on monitoring if 120 Hz flicker happens.

Figure 1:
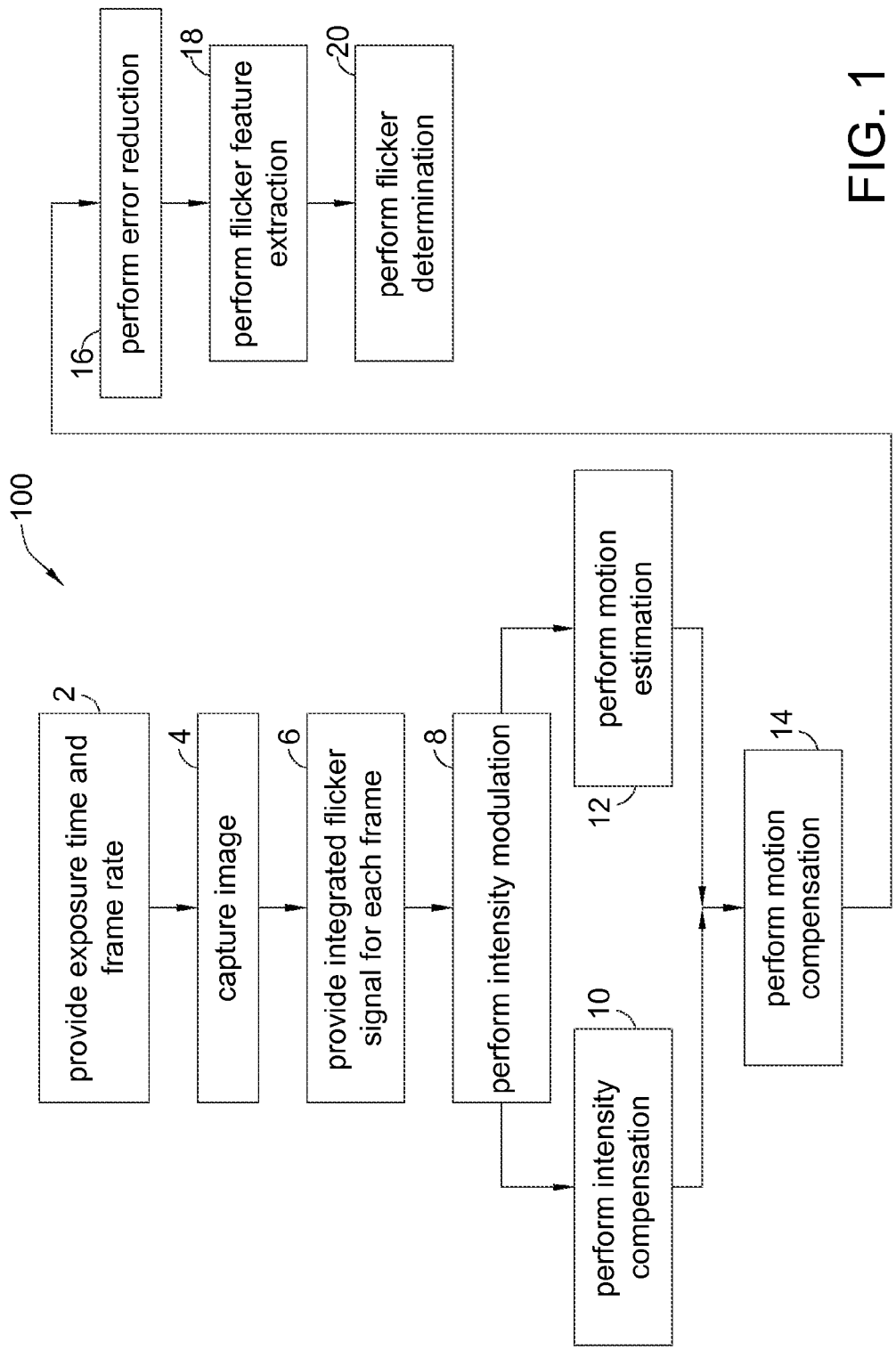
FIG. 1 illustrates a flowchart for flicker detection according to an embodiment of the invention.
Figure 2:
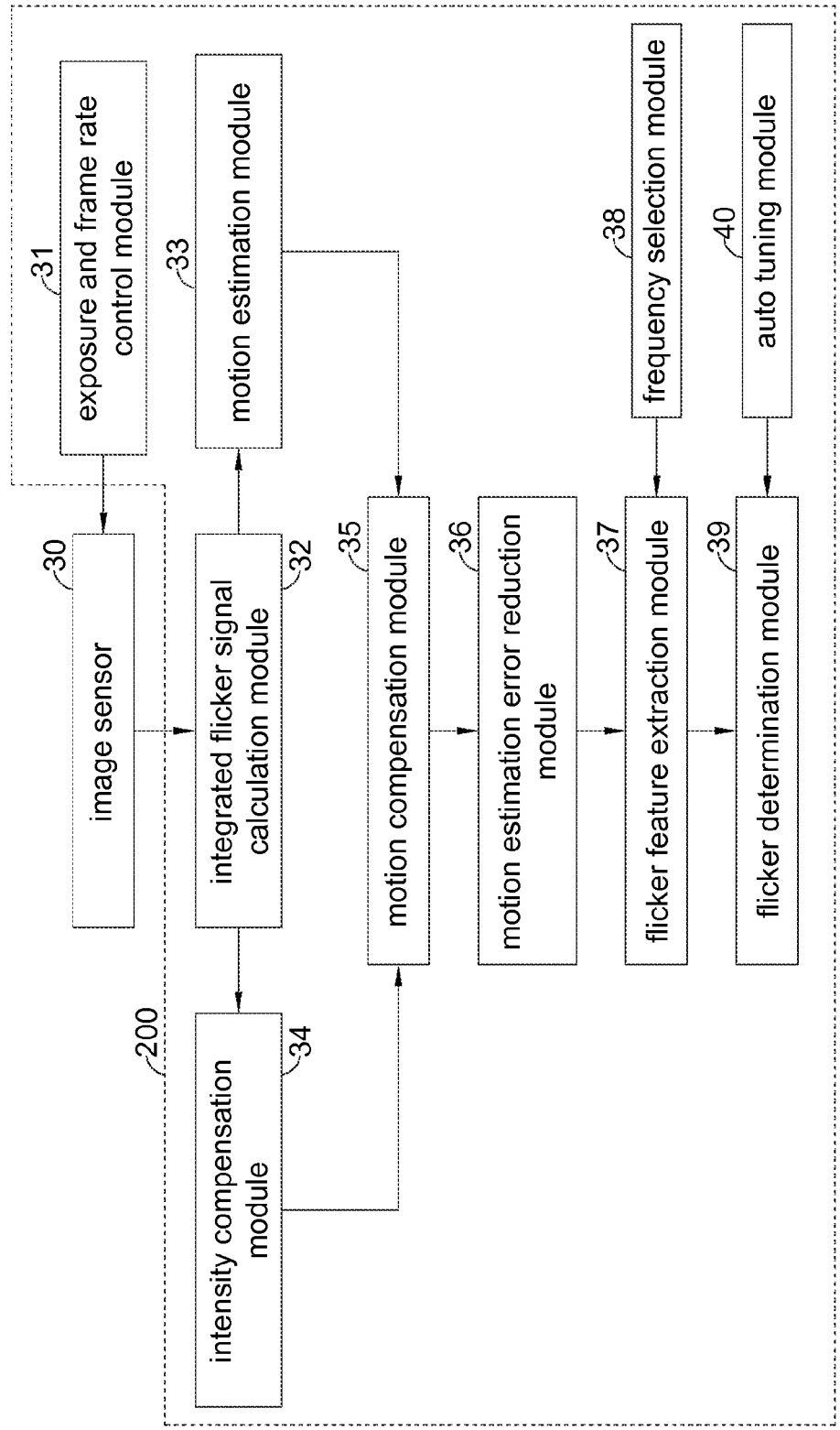
FIG. 2 illustrates a circuit for flicker detection according to an embodiment of the invention.

Please refer to FIG. 1 and FIG. 2. FIG. 1 illustrates a flowchart 100 for image-based flicker detection according to an embodiment of the invention, which may utilize differences from frame to frame to enhance signal to noise ratio of flicker detection. FIG. 2 illustrates a circuit 200 which may be embedded into an electronic device (not shown), and may apply the flowchart 100 to detect flicker according to images captured by an image sensor 30 of an image system (not shown) of the electronic device. For example, the circuit 200 may be a baseband processor, an application processor, a digital signal processor, a microcontroller, an integrated circuit, or a SOC (system-on-chip), a controller, a micro-controller, etc. The circuit 200 includes an exposure and frame rate control module 31, an integrated flicker signal calculation module 32, a motion estimation module 33, an intensity compensation module 34, a motion compensation module 35, a motion estimation error reduction module 36, a flicker feature extraction module 37, a frequency selection module 38, a flicker determination module 39 and an auto tuning module 40.

Most manufacturers of modern electronic devices specify that the flicker detection is able to detect dynamic light frequency switch while image system is staying on. Such demands may require the electronic device to dynamically analyze the image pattern for 100 Hz or 120 Hz flicker all the time, not only in the initial power-on stage (or camera-on stage) of the electronic device. Due to the demands of dynamic detection, the circuit 200 may always operate in a mode enabling cancellation of flicker at the detected flicker frequency, and enabling dynamical flicker detection for checking if current light changes frequency. For example, the circuit 200 may constantly (e.g., periodically) repeat execution of the flowchart 100 or perform the flowchart 100 by context awareness.

To achieve better user experience by suppressing flicker, the circuit 200 may prepare two sets of AE tables respectively for 50 Hz and 60 Hz: the 50 Hz AE table set may be designed to cancel flicker of 50 Hz AC powered light, and the 60 Hz AE table set may be designed to cancel flicker of 60 Hz AC powered light. For example, the 50 Hz AE table set for cancelling flicker of 50 Hz AC power may include several discrete exposure times for the image sensor 30, each exposure time may be a multiple of 10 ms; on the other hand, the 60 Hz AE table set for cancelling flicker of 60 Hz AC power may include another plurality of discrete exposure times, each exposure time may be a multiple of 8.33 ms. When the circuit 200 applies the 50 Hz AE table set to control the image sensor 30, the circuit 200 may also execute the flowchart 100 to detect if current ambient lights turn to fluctuate with 60 Hz AC power. Similarly, when the circuit 200 applies the 60 Hz flicker AE table set, the circuit 200 may also execute the flowchart 100 to detect if current ambient lights turn to fluctuate with 50 Hz AC power.

Figure 3:
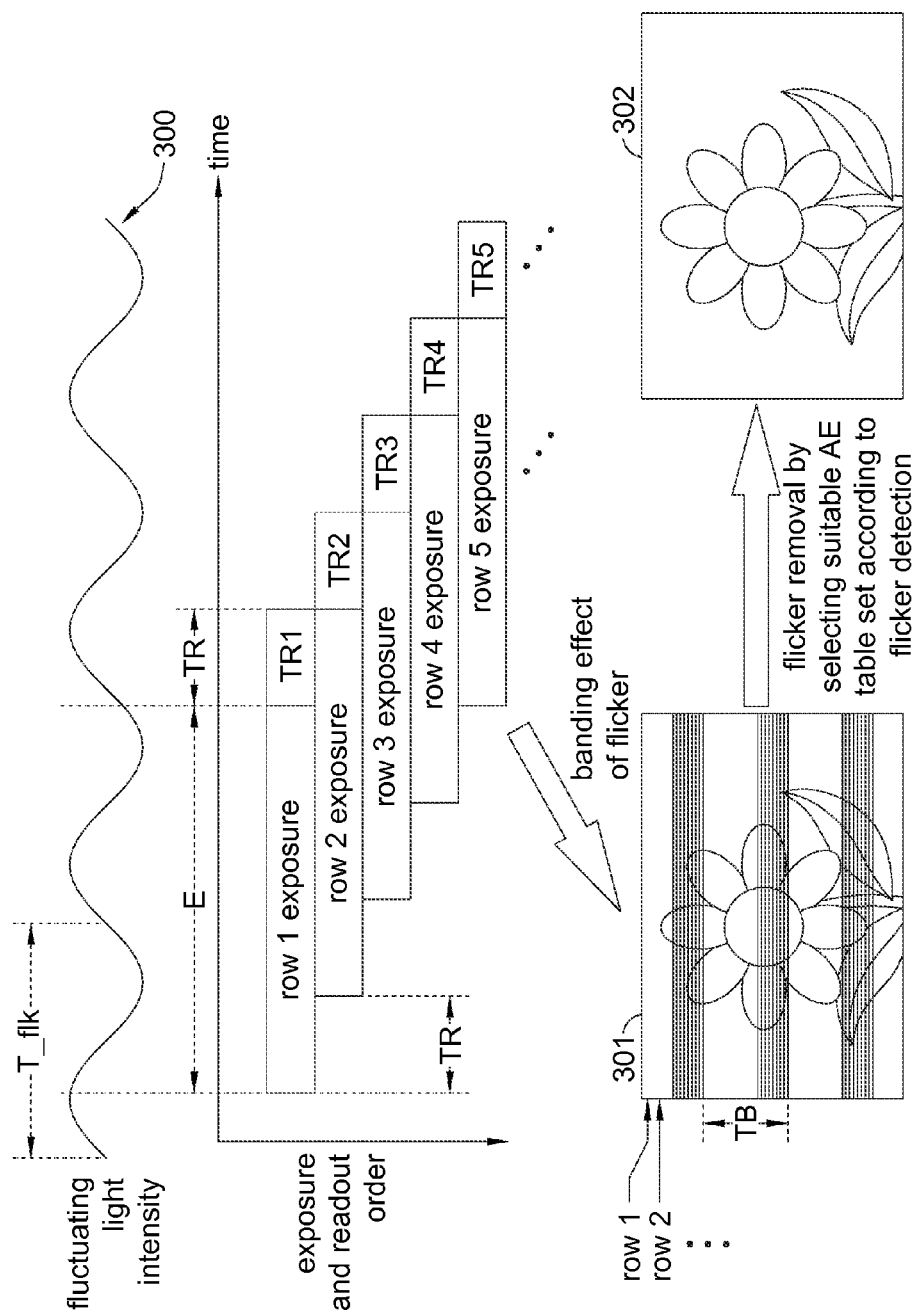
FIG. 3 illustrates sequential readout and flicker.

Along with FIG. 1 and FIG. 2, please refer to FIG. 3 depicting readout sequence of the image sensor 30 according to an embodiment of the invention. As shown in FIG. 3, each row (horizontal line) of the image sensor 30 may be exposed for an exposure time E, and be read out in a readout interval after exposure. For example, pixel data of pixels in row 1 may be read out during a readout interval TR1 after exposure of row 1; pixel data of pixels in an adjacent row 2 may be read out during a readout interval TR2 after exposure of row 2, etc. The readout intervals, e.g., TR1 to TR5, of different rows may last for a same duration denoted by a readout time TR.

To reduce complexity, consumed resources and cost of implementation image readout, the image sensor 30, e.g., a CMOS sensor array, may be designed to read only one row at any given time. The image sensor 30 may include a single row readout circuit (not shown). After exposure of each row is completed, pixel data of the pixels of the entire row are read out. Such single-row readout mechanism may therefore require a row-to-row delay between readout intervals of different rows, because pixel data of different rows may not be read out concurrently. For example, as shown in FIG. 3, the readout interval TR2 of the row 2 may start after the readout interval TR1 of the row1 ends, and the readout interval TR3 of the row 3 may start after the readout interval TR2 of the row2 ends. Consequently, there may also be a row-to-row delay between starting of exposure of different rows, so as to ensure that each row is exposed for the same amount of time. For example, as shown in FIG. 3, starting of exposure of the row 2 may be delayed by the readout time TR after starting of exposure of the row 1. This delay is the time for the readout circuit to complete the readout of one row.

While capturing images under light of fluctuation intensity shown as a waveform 300, the sequential capturing (exposure) and readout may also cause flicker, which may form an undesirable banding effect on the readout image, if the exposure time E of each row is not equal to an integer multiple of a fluctuating period T_flk of the fluctuating intensity. FIG. 3 also shows an exemplary image 301 which suffers the banding effect of flicker. Under sequential capturing and readout, the temporal fluctuation waveform 300 is transferred to undesired spatial brightness variation modulating desired contents of the readout image 301, hence the resultant contents of the image 301 are interfered by interlacing brighter and darker bands horizontally extending along rows of the image 301 and vertically repeating at a spatial banding period TB. That is, the temporal intensity fluctuation period T_flk may be reflected by the spatial banding period TB.

To address the flicker issue, flicker detection of the flowchart 100 may be utilized to identify if flicker of a given flicker frequency exists, so the circuit 200 may adaptively select suitable AE table set to eliminate the banding effect, and thus obtain an image 302 free of flicker banding effect.

Referring back to FIG. 1 and FIG. 2, functions of the modules in the circuit 200 (FIG. 2) and major steps of the flowchart 100 (FIG. 1) may be described as follows.

Step 2: by the exposure and frame rate control module 31, provide an exposure time E' and a frame rate R' for optimal flicker detection. Hence, during flicker detection of the flowchart 100, the exposure time E (FIG. 3) for exposing each row may be set equal to the exposure time E', and the frame rate for capturing successive frames may be set equal to the frame rate R'.

In this embodiment, the ability to detect flicker may rely on presence of a spatial flicker pattern originating from the banding effect; the flicker pattern may be obtained based on one or more captured images, e.g., based on a difference between successively captured images (frames). The factors that directly affect or determine characteristics of the flicker pattern may include the readout time TR and the exposure time E' applied by the image sensor 30 during flicker detection. Additionally, the frame rate R' utilized during flicker detection may also play an important role, since the flicker pattern may relate to two consecutive frames. The main factors relating to characteristics (attributes) of the flicker pattern may be listed in the following table:

| Factor | Associated flicker attribute |
|---|---|
| readout time TR (row delay) of the image sensor 30 (measured by seconds per row) | spatially vertical repetition period of the banding effect (measured by number of rows), denoted by TB |
| exposure time E' (measured by seconds) | flicker amplitude modulation factor of single frame, denoted by A1 |
| Frame rate R' (measured by number of frames per sec) | flicker amplitude modulation factor of frame difference, denoted by A2 |

The readout time TR may relate to specifications of the image sensor 30, as shown below:

$$TR = \frac{\text{full line pixel count (pixel/row)}}{\text{pixel clock rate (pixel·Hz)}}. \quad (\text{eq}101)$$

If there is an illumination fluctuation from AC powered fluorescent lights, each row will be exposed at different time intervals of the illumination fluctuation waveform 300, as shown in FIG. 3, which causes the uneven intensity bands on each captured image row-wise.

From the temporal illumination intensity fluctuation period, the spatial banding period TB of the banding effect, measured in terms of number of rows, may be deduced as:

$$TB = \frac{1}{TR \cdot f\_flk} = \frac{\text{pixel clock rate (pixel·Hz)}}{\text{full line pixel count (pixel/row)} \cdot f\_flk(Hz)}, \quad (\text{eq}102)$$

where the term f_flk is the temporal intensity flicker frequency, which may be either 100 Hz or 120 Hz respectively under 50 Hz or 60 Hz AC powered light.

Provided sinusoidal nature of the light fluctuation, it may be convenient to consider the effect of sequential exposure in temporal frequency domain. For each row (line), exposure operation performed on each line is equivalent to applying a temporal rectangular average filter to ambient light (as an input light). The width of the average filter is the exposure time E'. The light collected during the exposure time E', as an output light, is output of the average filter applied to the input light. The frequency response of the average filter is a sinc function, which gives:

$$L'(u) = L(u) \cdot Wf(u) = L(u) \cdot \frac{\sin(E' \cdot \pi \cdot u)}{E' \cdot \pi \cdot u}, \quad \text{(eq103)}$$

where the frequency variable is denoted by the term u. The terms L(u) and L'(u) are the frequency response of the input light and the output light after exposure, respectively, the term Wf(u) is the frequency response of the exposure operation, and the term E' is the exposure time.

Considering the main flicker frequency component and ignoring the higher order harmonics, the amplitude of the main flicker frequency component is attenuated by a factor of:

$$A1 = \frac{|L'(u)|}{|L(u)|}\bigg|_{u=f\_flk} = \left|\frac{\sin(E \cdot f\_flk \cdot \pi)}{(E \cdot f\_flk \cdot \pi)}\right|. \quad \text{(eq104)}$$

With the terms f_flk and E' respectively being the flicker frequency and the exposure light, the term A1 in equation eq104 is the flicker amplitude modulation factor of single frame, since it is induced by the average filter applying to each row of each frame (image).

Figure 4:
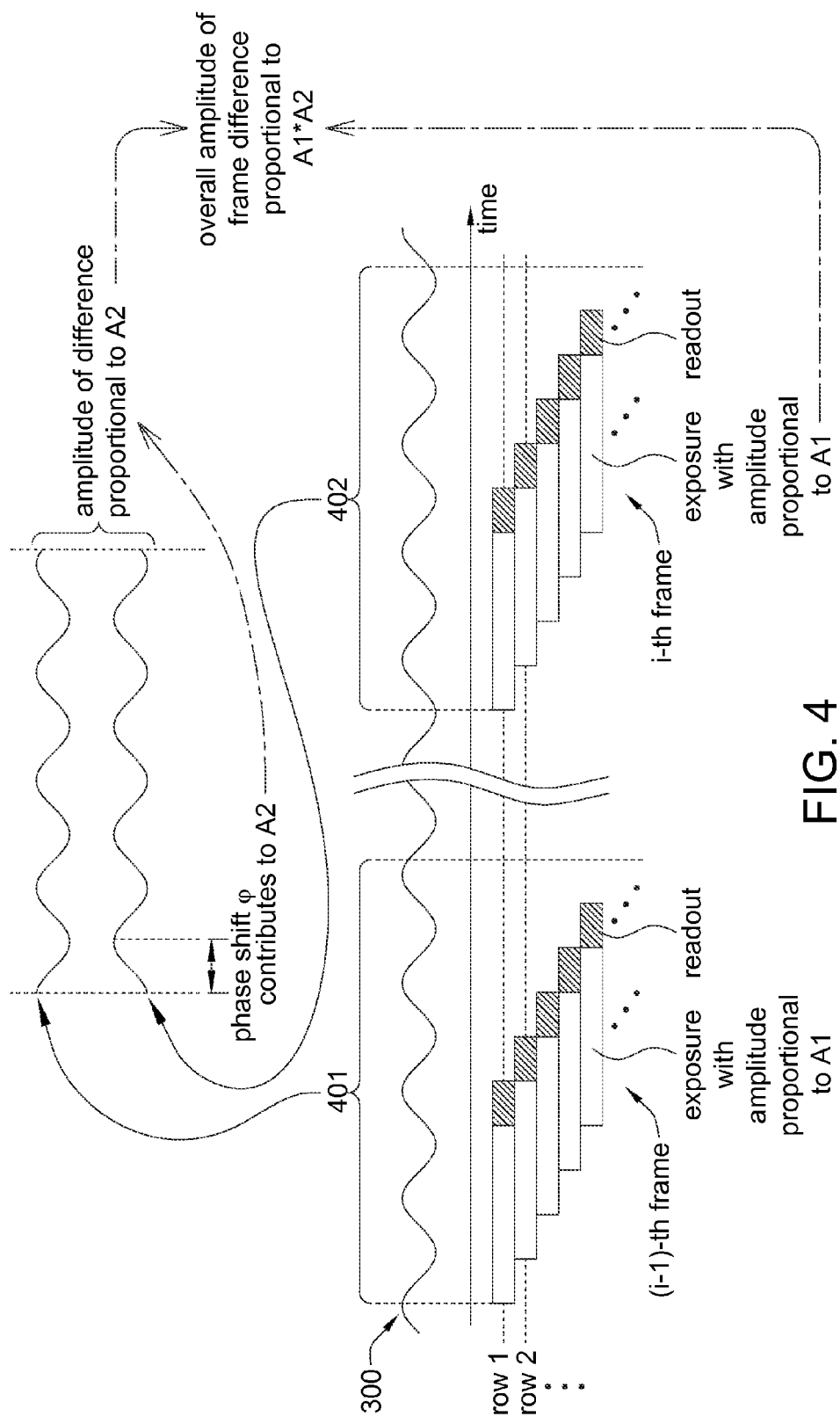
FIG. 4 illustrates difference between two consecutive frames.

Besides exposure operations on rows of each single frame, the flicker pattern may also rely on taking a difference of two different (e.g., consecutive) frames in order to remove the image contents and get a stronger and cleaner flicker signal. Along with FIG. 1 to FIG. 3, please refer to FIG. 4 illustrating exposure of different frames. To support flicker detection based on frame difference, two portions 401 and 402 of the light fluctuation waveform 300 respectively exposing two different frames (e.g., an (i−1)-th frame and i-th frame) are expected to be temporally "moving", i.e., to have a phase shift φ in terms of the fluctuation period. If the portions 401 and 402 respectively applied to the two different frames are in opposite phase, strength of the frame difference is the highest. Quantitative analysis gives that the phase shift is dependent on the frame rate R' and the flicker frequency f_flk by:

$$\varphi = 2\pi \cdot Frac\left(\frac{f\_flk}{R'/Ns}\right), \quad \text{(eq105)}$$

wherein the term Ns is a frame sampling factor of flicker statistics collection, and function Frac(x_in) is the fractional part of the argument x_in. The amplitude of the difference of two sinusoidal signals (e.g., the portions 401 and 402) may be calculated from their phase difference:

$$\sin(\theta+\varphi)-\sin(\theta)=\sin(\varphi/2)\cdot\cos(\theta+\varphi/2). \quad \text{(eq106)}$$

Therefore, for a given phase shift φ, the difference of two sinusoidal signals is still a sinusoidal signal with the same frequency (the term cos(θ+φ/2)), with its amplitude modulated by a function of the phase shift φ (the term sin(φ/2)). When the phase shift φ equals π, the modulation due to the term sin(φ/2) is the strongest, and when the phase shift φ equals 0 or 2π, the modulation is the weakest so the difference signal disappears. Therefore, the factor that determines the flicker amplitude modulation factor of frame difference, denoted by a term A2, is related to the flicker frequency f_flk and the frame rate R' by ignoring the constant scalar 2:

$$A2 = \sin(\varphi/2) = \sin\left(\pi \cdot Frac\left(\frac{f\_flk}{R'/Ns}\right)\right). \quad \text{(eq107)}$$

Finally, the overall amplitude A of the frame difference may be described as:

$$A = A1 \cdot A2 = \underbrace{\left|\frac{\sin(E' \cdot f\_flk \cdot \pi)}{(E' \cdot f\_flk \cdot \pi)}\right|}_{\text{Exposure term}} \cdot \underbrace{\sin\left(Frac\left(\frac{f\_flk}{R'/Ns}\right) \cdot \pi\right)}_{\text{Frame rate term}}. \quad \text{(eq108)}$$

It is noted that overall amplitude A may be a multiplication of the two factors A1 and A2. The two factors A1 and A2 are basically independent except that they both relate to the flicker frequency f_flk. The first factor A1 depends on the exposure time E', and the second factor A2 depends on the frame rate R' and the sampling rate Ns. This indicates that the exposure time E' and the frame rate R' may be individually optimized to maximize the amplitude A of the frame difference, and therefore enhancing flicker detection ability. In other words, according to equations eq104 and eq107, the exposure and frame rate control module 31 (FIG. 2) may provide suitable exposure time E' and frame rate R' which may respectively maximize the factors A1 and A2, and therefore maximize the overall amplitude A of the frame difference to better reflect presence of flicker.

As a brief summary of step 2, step 2 may include:
providing the exposure time E' according to maximizing, at the flicker frequency f_flk, a frequency response of exposure, as expressed by equation eq104;
providing a frame rate R' according to maximization of the amplitude difference between a fluctuation waveform (e.g., the portion 401 in FIG. 4) and a delayed fluctuation waveform (e.g., the portion 402) which is delayed by a phase shift φ associated to an interval between the frames (e.g., the (i−1)-th and i-th frames), as expressed by equation eq107.

Step 4 (FIG. 1): by the exposure and frame rate control module 31, causing the image sensor 30 (FIG. 2) to capture images (e.g., the consecutive (i−1)-th and i-th frames shown in FIG. 4) at the frame rate R', each frame exposed with the exposure time E'. In other words, the exposure and frame rate control module 31 is capable of implementing steps 2 and 4.

Step 6 (FIG. 1): by the integrated flicker signal calculation module 32, provide (e.g., calculate) an integrated flicker signal S_flk from each frame, e.g., an integrated flicker signal S_flk[i] from an i-th frame. Along with FIG. 1 to FIG. 4, please refer to FIG. 5 illustrating forming of the integrated flicker signal S_flk[i] of an i-th frame according to an embodiment of the invention.

Figure 5:
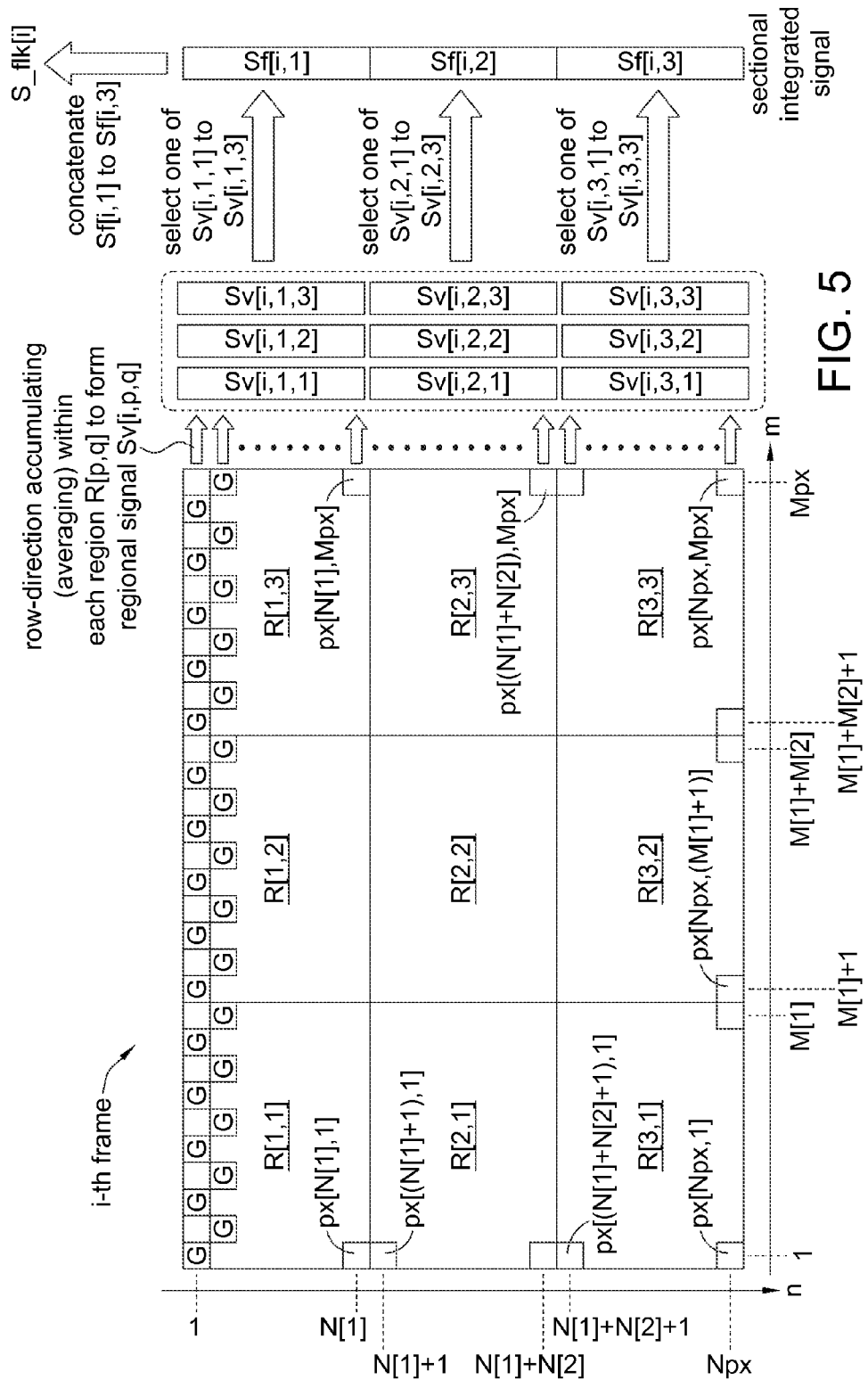
FIG. 5 illustrates forming of integrated flicker signal according to an embodiment of the invention.

While an i-th frame (image) may include Npx*Mpx pixels with each pixel denoted by px[n,m], the frame may be divided to P*Q regions R[1,1] to R[P,Q], e.g., 3*3 (P=Q=3) equally divided regions R[1,1] to R[3,3] as shown in the example of FIG. 5. Each region R[p,q] (for p=1 to P, q=1 to Q) may include N[p]*M[q] pixels px[(sn[p−1]+1),(sm[q−1]+1)] to px[(sn[p−1]+1),(sm[q−1]+M[q])], px[(sn[p−1]+2),(sm[q−1]+1)] to px[(sn[p−1]+2),(sm[q−1]+M[q])], . . . , and px[(sn[p−1]+N[q]),(sm[q−1]+1)] to px[(sn[p−1]+N[q]),(sm[q−1]+M[q])], with sn[p−1]=N[1]+N[2]+ . . . +N[p−1], sn[0]=0, N[1]+N[2]+ . . . +N[P]=Npx, sm[q−1]=M[1]+M[2 ]+ . . . +M[q−1], sm[0]=0, and M[1]+M[2]+ . . . +M[Q]=Mpx. In other words, each of all the Npx horizontal rows may be divided to Q row sections respectively including M[1] to M[Q] pixels, and each region R[p,q] may include N[p] vertically adjacent row sections, with each row section including M[q] pixels.

For each region R[p,q], the integrated signal calculation module 32 may calculate a regional signal Sv[i,p,q], which may be a vector (one-dimensional matrix) including a number N[p] of elements; each element, denoted by Sv[i,p,q,n'] (for n'=1 to N[p]), may be calculated by:

$$Sv[i, p, q, n'] = \sum_{m'=1}^{M[q]} pxD[i, (n' + sn[p-1]), (m' + sm[q-1])] / M[q]; \quad (\text{eq201})$$

where the term pxD[i,(n'+sn[p−1]),(m'+sm[q−1])] (for n'=1 to N[p] and m'=1 to M[q]) may be a pixel data of the pixel px[(n'+sn[p−1]),(m'+sm[q−1])] of the i-th frame. For example, the pixel data pxD[i,(n'+sn[p−1]),(m'+sm[q−1])] may be a green channel intensity of the pixel px[(n'+sn[p−1]),(m'+sm[q−1])], denoted by "G" in FIG. 5. As described by equation eq201, each element Sv[i,p,q,n'] of the regional signal Sv[i,p,q] may accumulate (and average) pixel data along a row section of the region R[p,q], and the elements Sv[i,p,q,1] to Sv[i,p,q,N[p]] accumulating pixel data respectively along the first to the N[p]-th row sections of the region R[p,q] may collectively form the regional signal Sv[i,p,q]. As shown in the example of FIG. 5, for the 3*3 regions R[1,1] to R[3,3], the integrated signal calculation module 32 (FIG. 2) may respectively calculate 3*3 regional signal Sv[i,1,1] to Sv[i,3,3].

Among the regional signals Sv[i,p,1] to Sv[i,p,Q], the integrated signal calculation module 32 may further make a selection to select one of the regional signals Sv[i,p,1] to Sv[i,p,Q] as a sectional integrated signal Sf[i,p]. For example, among the regional signals Sv[i,p,1] to Sv[i,p,Q], the integrated signal calculation module 32 may evaluate flatness of each regional signal (e.g., deviation of elements of each regional signal), and then select according to flatness, e.g., select the regional signal with the greatest flatness (e.g., lowest deviation) among the regional signals Sv[i,p,1] to Sv[i,p,Q] to be the sectional integrated signal Sf[i,p]. Like each of the regional signals Sv[i,p,1] to Sv[i,p,Q], the sectional integrated signal Sf[i,p] includes N[p] elements.

Collectively for p=1 to P, the integrated signal calculation module 32 may make P selections to respectively provide P sectional integrated signals Sf[i,1] to Sf[i,P], with a p-th selection selecting one of the regional signals Sv[i,p,1] to Sv[i,p,Q] to be the sectional integrated signal Sf[i,p]. For example, the regional signal Sv[i,1,2] among the regional signals Sv[i,1,1] to Sv[i,1,3] may be selected as the sectional integrated signal Sf[i,1], the regional signal Sv[i,2,2] among the regional signals Sv[i,2,1] to Sv[i,2,3] may be selected as the sectional integrated signal Sf[i,2], and the regional signal Sv[i,3,1] among the regional signals Sv[i,3,1] to Sv[i,3,3] may be selected as the sectional integrated signal Sf[i,3].

As the P sectional integrated signals Sf[i,1] to Sf[i,P] are selected, the integrated signal calculation module 32 may further concatenate the P sectional integrated signals Sf[i,1] to Sf[i,P] to form the integrated flicker signal S_flk[i] as a preliminary integrated flicker signal. Accordingly, the integrated flicker signal S_flk[i] may include Npx elements, the first to the N[1]-th elements of the integrated flicker signal S_flk[i] may be the N[1] elements of the sectional integrated signal Sf[i,1], and the (N[1]+1)-th to the (N[2]+N[1])-th elements of the integrated flicker signal S_flk[i] may be the N[2] elements of the sectional integrated signal Sf[i,2], etc.; finally, the last N[P] elements of the integrated flicker signal S_flk[i] may be the N[P] elements of the sectional integrated signal Sf[i,P]. An n-th element of the integrated flicker signal S_flk[i] of the i-th frame may be denoted by S_flk[i,n], for n=1 to Npx. Because the n-th element S_flk[i,n] corresponds to the n-th row of the i-th frame, the integrated signal S_flk[i] may be regarded as a spatial distribution of selected sectional accumulation of pixel data. That is, the element S_flk[i,n] may also be expressed as S_flk[i,x], with x representing a vertical location of the n-th row.

As a brief summary of step 6, step 6 may include: providing an integrated flicker signal S_flk for each frame (image), e.g., an integrated flicker signal S_flk[i] for the i-th frame, by accumulating pixel data of a number of pixels of each frame along a direction (row) of each frame, as expressed by equation eq201. In other words, step 6 may include:

categorizing each row of each image to a plurality (e.g., a number Q) of row sections;

grouping a plurality of subsets of the plurality of row sections to a plurality of regions R[1,1] to R[P,Q], respectively; e.g., grouping N[p] vertically adjacent row sections to a region R[p,q], with each row section including M[q] pixels of a row;

providing a plurality regional signals Sv[i,1,1] to Sv[i,P,Q] respectively associated with the plurality regions R[1,1] to R[P,Q] by accumulating pixel data of each pixel in each row section of each region R[p,q] to provide an element Sv[i,p,q,n'] of each regional signal Sv[i,p,q], as expressed by equation eq201;

among the regional signals Sv[i,p,1] to Sv[i,p,Q] which associate with row sections belonging to same rows, selecting one as a sectional integrated signal Sf[i,p]; and concatenating a plurality of sectional integrated signals Sf[i,1] to Sf[i,P] to form the integrated flicker signal S_flk[i].

Figure 6:
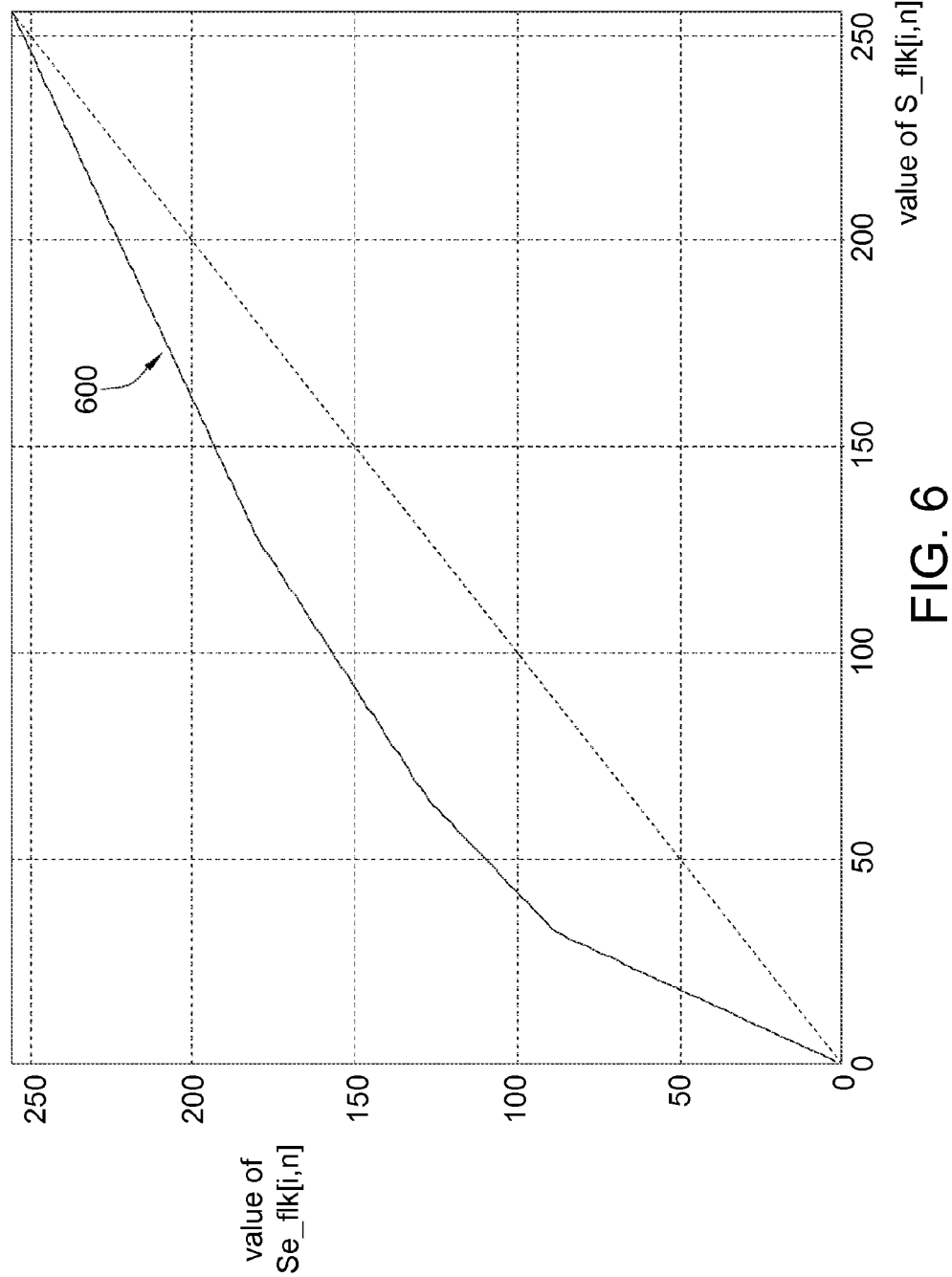
FIG. 6 illustrates an intensity modulation according to an embodiment of the invention.

Step 8 (FIG. 1): also by the integrated flicker signal calculation module 32, perform an intensity modulation on the preliminary integrated flicker signal S_flk of each frame, e.g., the integrated flicker signal S_flk[i] of the i-th frame, and accordingly generate an integrated flicker signal Se_flk as an enhanced integrated flicker signal for each frame, e.g., an integrated flicker signal Se_flk[i] for the i-th frame. The intensity modulation applied to the preliminary integrated flicker signal S_flk[i] may include gamma correction and/or variance stabilization transform, for reducing the impact of noise of image capturing. Along with FIG. 1 to FIG. 5, please refer to FIG. 6 depicting a transfer curve 600 as an example of the intensity modulation. Similar to the integrated flicker signal S_flk[i] which includes Npx elements S_flk[i,1] to S_flk[i,Npx], the integrated flicker signal Se_flk[i] may also include same number Npx of elements, denoted by Se_flk[i,n] for n=1 to Npx. According to the transfer curve 600, the n-th element S_flk[i,n] of the integrated flicker signal S_flk[i] may be mapped to an n-th element Se_flk[i,n] of the integrated flicker signal Se_flk[i], for n=1 to Npx.

As shown in the example of FIG. 6, if value of the element S_flk[i,n] is 50, then value of the element Se_flk[i,n] may be mapped to be greater than 50, e.g., be approximately 110. A difference between values of the n-th elements Se_flk[i,n] and S_flk[i,n] of the signals Se_flk[i] and S_flk[i] may vary with the index n, e.g., a difference between the elements Se_flk[i,n1] and S_flk[i,n1] may be different from or equal to a difference between the elements Se_flk[i,n2] and S_flk[i,n2], with n1 and n2 unequal.

The intensity modulation performed on the integrated flicker signal S_flk of each frame may reduce noise induced by the image sensor. The integrated flicker signal calculation module 32 may implement steps 6 and 8.

Step 10 (FIG. 1): by the intensity compensation module 34 (FIG. 2), perform an intensity compensation on each integrated flicker signal Se_flk, e.g., the integrated flicker signal Se_flk[i] of the i-th frame, and accordingly provide an integrated flicker signals Sc_flk, as a compensated integrated flicker signal, for each frame; e.g., provide an integrated flicker signal Sc_flk[i] for the i-th frame. The intensity compensation may be applied for stabilizing the flicker intensity variation due to object reflectance or exposure fluctuation. Similar to the integrated flicker signals S_flk[i] and Se_flk[i], the integrated flicker signal Sc_flk[i] may include Npx elements, with an n-th element denoted by Sc_flk[i,n] for n=1 to Npx.

Without loss of generality, flicker at a location x of an i-th frame, denoted by l[i,x], may be determined by a light source intensity L[i,x] and an object reflectance rflct[i,x], while the light source intensity fluctuates due to power source fluctuation, i.e., $$l[i,x]=L[i,x]\cdot rflct[i,x]=A[i,x]\cdot F[i,x]\cdot rflct[i,x]; \quad \text{(eq301)}$$

where the terms A[i,x] and F[i,x] may respectively represent amount of incident light and exposure, and the flicker l[i,x] may be the integrated flicker signal S_flk[i,n], with x representing vertical location of the n-th row of the i-th frame.

While taking a difference between frames to eliminate the contribution from scene contents, the resulting difference, denoted by FLK[i,x], may be expressed by:

$$FLK[i,x]=l[i,x]-l[i-1,x]. \quad \text{(eq302)}$$

Figure 7:
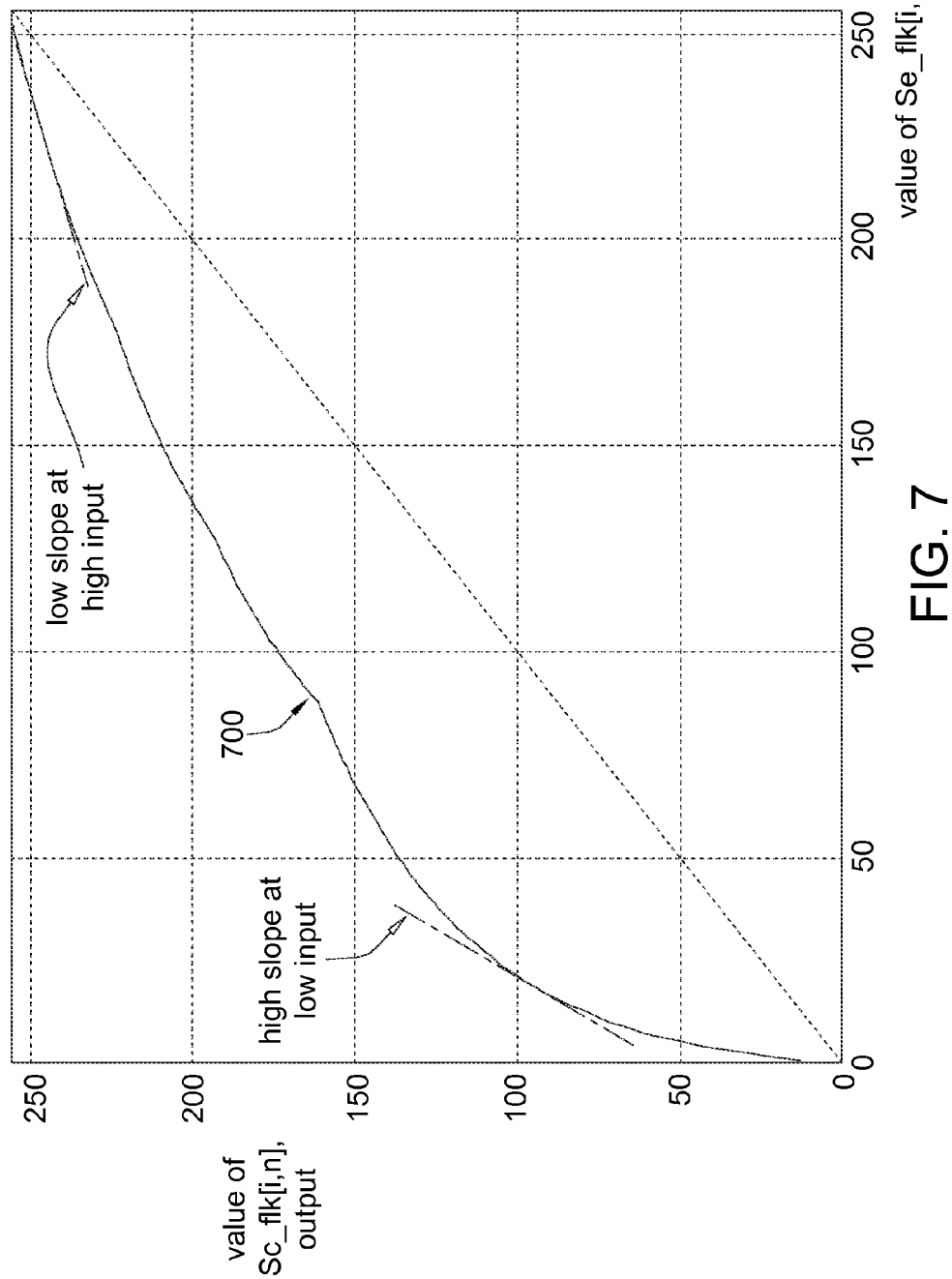
FIG. 7 illustrates an intensity compensation according to an embodiment of the invention.

As expressed by equation eq302, If there is a large variation of the reflectance rflct[.,x] and/or the light source intensity L[.,x] due to auto-exposure, the resulting difference FLK[1,x] will also be affected. Therefore, an intensity transformation, e.g., a compensation curve 700 as shown in FIG. 7, may be applied to the intensity compensation of step 8 by mapping each element Se_flk[i,n] (as an input) to each element Sc_flk[i,n] (as an output). For example, the intensity compensation may boost the output value differences for low input values (i.e., slope of the compensation curve 700 at low input values), while suppress the output value differences for high input pixel values (i.e., slope of the compensation curve 700 at high input values).

By subtracting integrated flicker signals of consecutive frames after the intensity compensation of step 10, variation caused by object reflectance and auto-exposure fluctuation may be alleviated. In an embodiment, the curve 700 may be a logarithmic mapping; e.g., the element Sc_flk[i,n] may be calculated based on log(Se_flk[i,n]).

As a brief summary of step 10, the intensity compensating performed on the integrated flicker signal Se_flk of each image may alleviate a variation between images owing to auto exposure. The intensity compensation module 34 may implement step 10.

Step 12 (FIG. 1): by the motion estimation module 33 (FIG. 2), perform a motion estimation on integrated flicker signals of different frames, e.g., the integrated flicker signal Sc_flk[i-1] and Sc_flk[i] of two consecutive (i-1)-th and i-th frames. As a preparation for calculating a flicker signal difference indicative of flicker, the motion estimation of step 12 aims to find a translational displacement which may align scene contents embedded in the integrated flicker signal Sc_flk[i-1] and Sc_flk[i], hence scene content change between frames will not interfere characterization of flicker.

Figure 8:
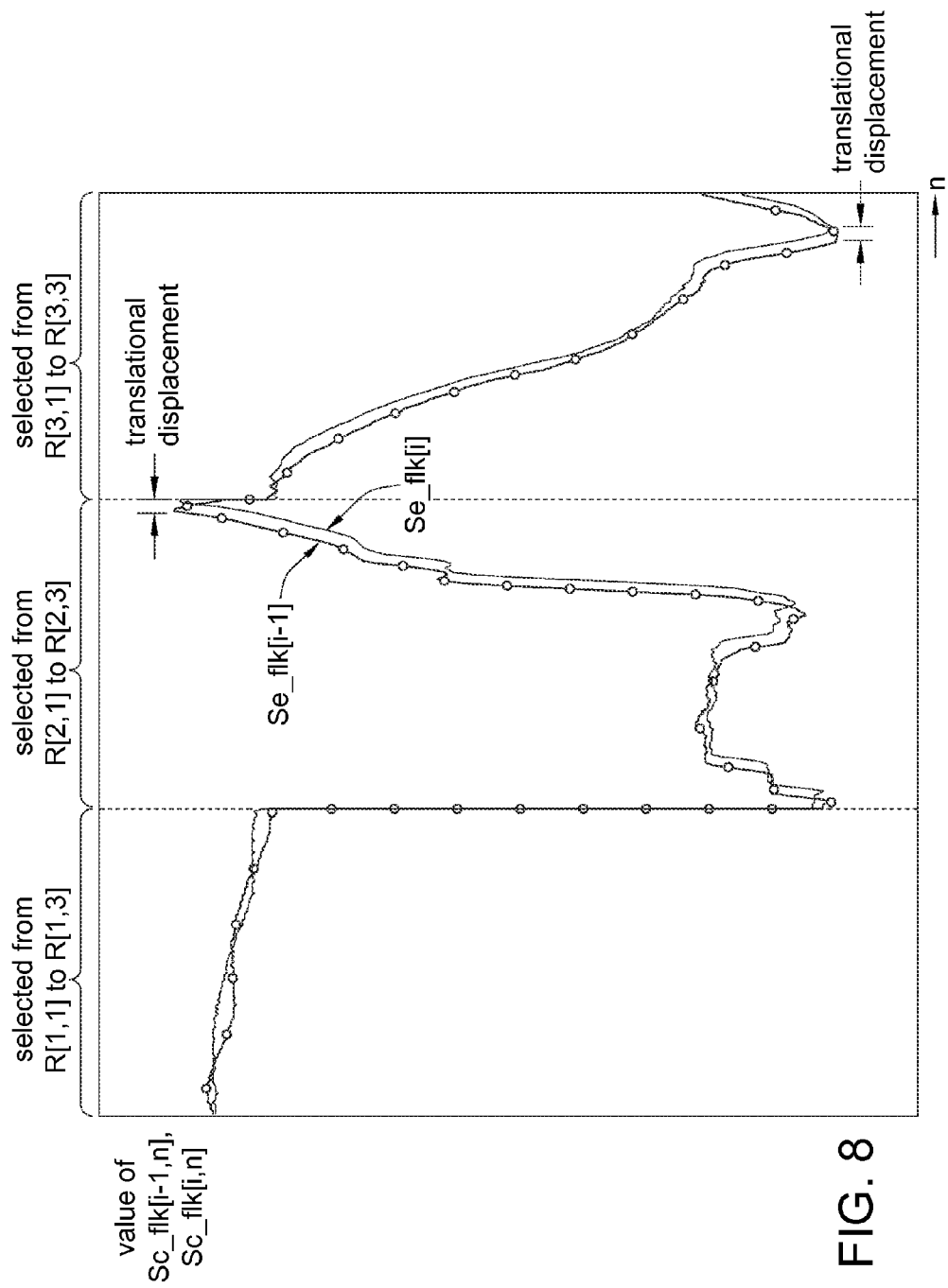
FIG. 8 illustrates an example demonstrating motion between integrated flicker signals of two consecutive frames.
Figure 9:
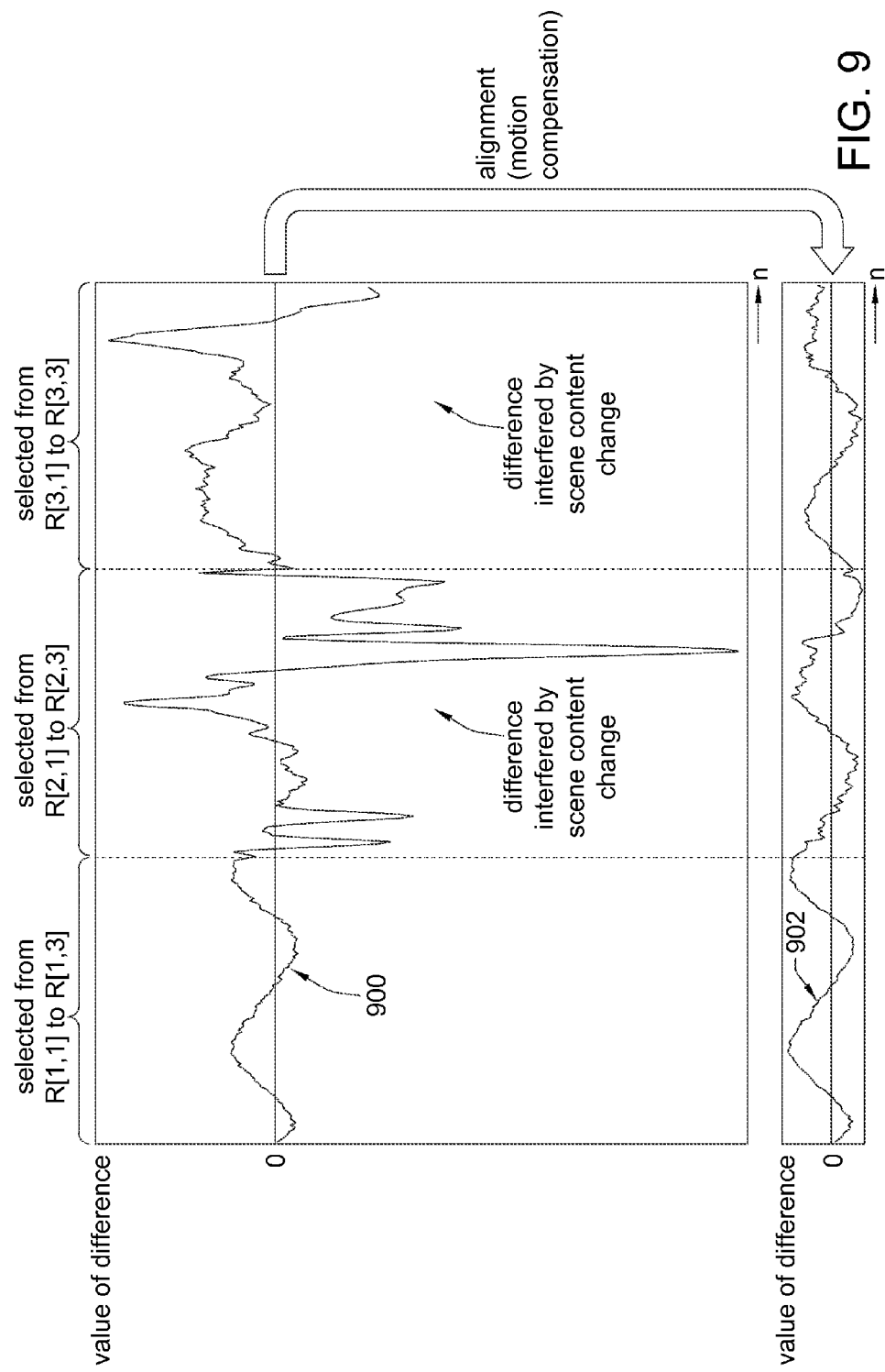
FIG. 9 illustrates an example of motion compensation.

Along with FIG. 1 to FIG. 5, please refer to FIG. 8 and FIG. 9. FIG. 8 illustrates an example of the integrated flicker signal Sc_flk[i-1] and an example of the integrated flicker signal Sc_flk[i]; as shown in FIG. 8, portion(s) of the integrated flicker signal Sc_flk[i] may experience a translational displacement with respect to associated portion(s) of the integrated flicker signal Sc_flk[i-1]. The translational displacement may reflect scene content change due to motion between the (i-1)-th and i-th frames. Continuing the example in FIG. 8, FIG. 9 illustrates two differences 900 and 902. The difference 900 reflects a direct subtraction of the integrated flicker signals (Sc_flk[i]-Sc_flk[i-1]), where scene content change due to motion interferes flicker pattern. On the other hand, the difference 902 reflects an aligned (motion compensated) difference, which may be formed by: performing a motion estimation for finding amount of the translational displacement between offset portion(s) of the integrated flicker signals Sc_flk[i-1] and Sc_flk[i], performing a motion compensation for aligning the offset portion(s) of the integrated flicker signals Sc_flk[i-1] and Sc_flk[i] according to the translational displacement, and then subtracting the aligned integrated flicker signals. Because of the alignment (motion compensation), interference due to scene content change may be suppressed for more accurate characterization of flicker. As shown in FIG. 9, the aligned difference 902 may better indicate a sinusoidal spatial flicker pattern, comparing to the direct (unaligned) difference 900. To achieve such alignment between the integrated flicker signals Sc_flc[i-1] and Sc_flk[i], motion estimation is performed at step 12 (FIG. 1).

Figure 10:
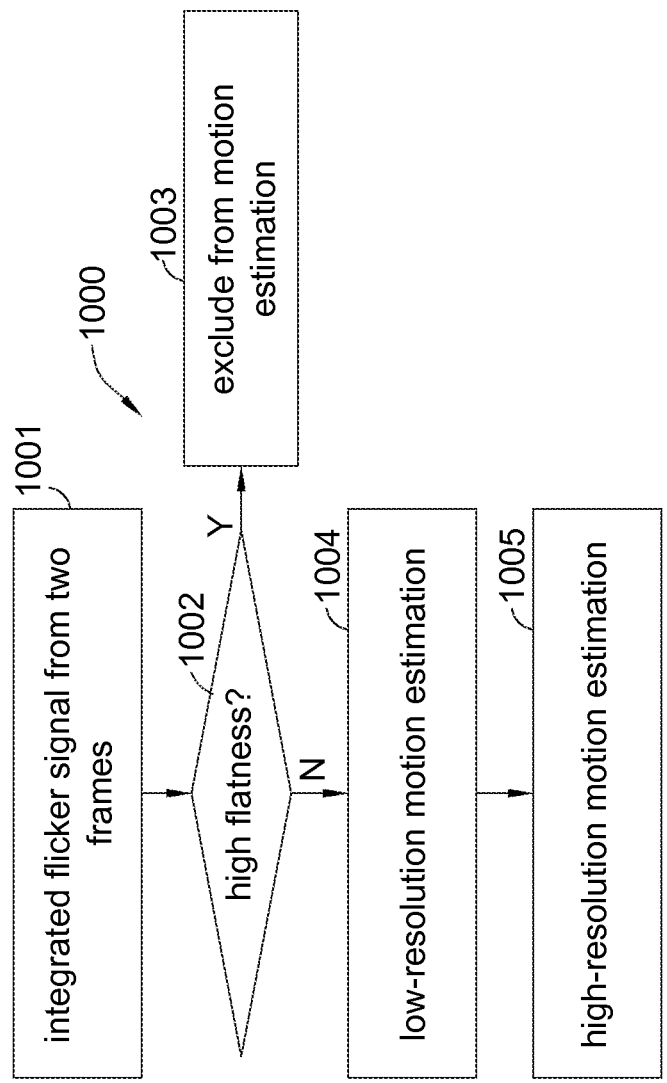
FIG. 10 illustrates a flowchart for motion estimation according to an embodiment of the invention.

Along with FIG. 1 to FIG. 5, please refer to FIG. 10 illustrating a flowchart 1000 for motion estimation according to an embodiment of the invention. The motion estimation module 33 (FIG. 2) may perform the motion estimation of step 12 by following the flowchart 1000, which may include steps 1001 to 1005. At step 1001, the flowchart 1000 may begin with the two integrated flicker signals Sc_flk[i-1] and Sc_flk[i] of the (i-1)-th and i-th frames.

As the two integrated flicker signals Sc_flk[i] and Sc_flk[i-1] are respectively derived from the integrated flicker signals S_flk[i] and S_flk[i-1] (FIG. 5) calculated at step 6, the sectional integrated signal Sf[i-1,p] forming the integrated flicker signal S_flk[i-1], as well as the sectional integrated signal Sf[i,p] forming the other integrated flicker signal S_flk[i], may be selected from the same region R[p,q], for p=1 to P. For example, if a sectional integrated signal Sf[i-1,p1] of the integrated flicker signal S_flk[i-1] is selected from a regional signal Sv[i-1,p1,q1] of the region R[p1,q1] of the (i-1)-th frame, then the sectional integrated signal Sf[i,p1] of the integrated flicker signal S_flk[i] may be selected from the regional signal Sv[i,p1,q1] of the same region R[p1,q1] of the i-th frame.

Then, an estimated motion, e.g., an estimated translational displacement x_off may be evaluated by a low-resolution motion estimation at step 1004 and a high-resolution motion estimation at step 1006. The low-resolution motion estimation may refine the alignment search range before a finer search is performed. During alignment search, a translational displacement resulting in a minimum motion error is found. The motion error may be defined as a (weighted) sum of absolute differences (SAD) between elements of a translated first integrated flicker signal of a first frame and elements of a second integrated flicker signal of a second frame, i.e., $$x\_off = \underset{x0}{\operatorname{argmin}} \sum_{xi \in XR} |(I[i, xi - x0) - I[i-1, xi]).W[xi]|, \quad (eq401)$$

where the term XR may represent vertical locations of all rows of a frame, the term W[xi] may be a window at a location xi for representing the region with prominent scene content for alignment, and the term l[i−1,xi] may be the element Sc_flk[i−1,n], with xi being a vertical location of the n-th row. A term $$ME[x0] = \sum_{xi \in XR} |(I[i, xi - x0) - I[i-1, xi]).W[xi]|$$

may represent a weighted SAD at an input offset x0 if each element l[i,xi] is shifted by the input offset x0. In other words, if an offset value x0_min is inputted to the motion error ME[x0] as the input offset x0 and minimizes ME[x0] over other possible values of the input offset x0, then the translational offset x_off may be solved to equal the offset value x0_min.

For a location xi at a flat field, it may not necessary to perform the alignment before subtracting the two integrated flicker signals. In fact, the alignment may undesirably cancel out the power line fluctuation, as the minimum difference in this situation occurs when the power line fluctuation is aligned, and the resulting difference would lose signature of flicker. Preferably, the flatness of a nearby area at each location xi is checked at step 1002, before steps 1003 and 1004. If gradient of the element l[i,xi1] at a location xi1 does not significantly change, then a proximity of the location xi1 may be determined to be a flat area at step 1002, and a less value (e.g., zero) may be assigned to the window W[xi1], so motion estimation and compensation on the location xi may be excluded (suppressed) at step 1003 by weighting the difference ||[i,xi1−x0]−l[i−1,xi1]| less. If gradient of the element l[i,xi2] at a location xi2 significantly changes, then a proximity of the location xi2 may be considered not to be a flat area at step 1002, and a greater value (e.g., one) may be assigned to the window W[xi2], so motion estimation and compensation may be performed on the location xi2 at step 1004 by weighting the difference ||[i,xi2−x0]−l[i−1,xi2]| more. That is, flatness at a location xi may be evaluated by value of the window W[xi], which may have a positive correlation with a gradient of the element l[i−1,xi] (or l[i,xi]) at the location xi. Low valued (less than a gradient threshold) window W[xi] may direct the flowchart 1000 from step 1002 to step 1003, and then the location xi may be excluded from motion estimation and compensation by less (or zero) weighted window W[xi] in equation eq401. High valued (greater than the gradient threshold) window W[xi] may direct the flowchart 1000 from step 1002 to step 1004, so the location xi may be included in motion estimation and compensation by more weighted window W[xi] in equation eq401. Gradient of the element l[i−1,xi] at a location xi may be numerically obtained, e.g., by ||[i−1,xi']−l[i−1,xi]|, with the term xi' being a location near (e.g., adjacent to) the location xi.

Moreover, the same gradient check at step 1002 may provide an alignment map by the window W[xi] at each location xi, and only the locations within high gradient (low flatness) area may need to be aligned at steps 1004 and 1005. In an embodiment, the search strategy for solving equation eq401 is to find a maximum overlap between high gradient areas of two frames while having the minimum motion error. By introducing the window W[xi], risk of accidently aligning power line fluctuation may be effectively reduced.

Steps 1004 and 1005 may respectively solve equation eq401 at difference resolution. For example, at step 1004, several first candidate offset values x0[1] to x0[J1], which may evenly distribute within a full row range bounded by minimum and maximum vertical locations of the rows, may be first selected, and then each of the first candidate offset values xc[1] to xc[J1] may be used as the input offset x0 to calculate an associated value of the motion error ME[x0]. If the motion error ME[xc[j1]] is the smallest among the motion error ME[xc[1]] to ME[xc[J1]], then, at step 1005, several second candidate offset values xd[1] to xd[J2], which may distribute in proximity of the first candidate offset value xc[j1], may be respectively inputted to the motion error ME[x0] as the input offset x0. If the motion error ME[xd[j2]] is the smallest among the motion error ME[xd[1]] to ME[xd[J2]], then the second candidate offset value xd[j2] may be selected as the translational displacement x_off of equation eq401, and step 1005 may therefore end and proceed to step 14 (FIG. 1). A separation distance between every two adjacent second candidate offset values xd[j'] and xd[j'+1] may be shorter (and therefore finer) than a separation distance between every two adjacent first candidate offset values xc[j] and xc[j+1].

As expressed by equation eq401, the motion estimate performed by the motion estimate module 33 at step 12 may base on two simplification assumptions: 1) the motion between the integrated flicker signals Sc_flk[i−1] and Sc_flk[i] may be modeled with a translation, and 2) the motion within a region may be modeled with a single (one-dimensional scalar) displacement. These two assumptions may not always be true, however, they may provide a simple and a satisfactory motion estimation solution, i.e., the integrated flicker signals from different frames may be aligned by shifting with a single (scalar) translational displacement. Though exhaustive search within certain row range may be utilized to find the translational displacement x_off which minimizes the motion error ME[x0], but computation cost and effort may be too high. Alternatively, a multi-resolution approach, as shown by steps 1004 and 1005 in FIG. 10, may be applied.

As a brief summary of step 12, step 12 may include: performing a motion estimation on two integrated flicker signals Sc_flk[i−1] and Sc_flk[i], including: solving a minimization of a motion error ME[x0] formulated based on a weighted sum of absolute differences of the two integrated flicker signals, and accordingly providing a translational displacement x_off, as expressed by equation eq401. The motion estimation module 33 may implement step 12.

For solving the minimization of the motion error, step 12 may further include:
  calculating a window W[xi] at each location xi according to spatial flatness of the integrated flicker signal Sc_flk[i] at each location xi;
  weighting a sum of absolute differences ||[i,xi−x0]−l[i−1,x]| of the two integrated flicker signals l[i,.] and l[i−1,.] (e.g., Sc_flk[i] and Sc_flk[i−1]) by the window W[xi] for formulating the motion error ME[x0], as expressed by equation eq401; wherein such weighting also implements step 1002 (FIG. 10); and
  solving the minimization of the motion error (e.g., equation eq401) at a low-resolution (step 1004, FIG. 10), and then solving the minimization of the motion error at a high-resolution (step 1005).

Step 14 (FIG. 1): by the motion compensation module 35 (FIG. 2), perform a motion compensation by aligning integrated flicker signals of two consecutive frames and subtracting the resultant aligned integrated flicker signals. In an embodiment, the motion compensation may provide an aligned difference DF with Npx elements DF[1] to DF[Npx]; the n-th element DF[n] may also be expressed as DF[x] with x being the vertical location of the n-th row, and the element DF[x] may be computed by:

$$DF[x] = \begin{cases} I[i, x - x\_off] - I[i, x], & \text{for low flatness} \\ I[i, x] - I[i-1, x], & \text{for high flatness} \end{cases} \quad (eq501)$$

wherein the flatness may be classified according to the window W[x], similar to step 1002 (FIG. 10). The difference 902 shown in FIG. 9 demonstrates an example of the aligned difference DF.

As a brief summary of step 14, step 14 may perform a motion compensation, including: comparing two integrated flicker signals (e.g., Sc_flk[i−1] and Sc_flk[i]) of two images (e.g., the (i−1)-th and i-th frames), and accordingly providing a flicker signal difference, e.g., the aligned difference DF. The motion compensation module 35 may implement step 14.

While comparing two integrated flicker signal, as expressed by equation eq501, step 14 may include:

aligning a first one of the two integrated flicker signals (e.g., l[i,x]) with a second one of the two integrated flicker signals (e.g., l[i−1,x]) according to the translational displacement x_off, and subtracting the aligned first integrated flicker signal (e.g., l[i,x−x_off]) with the second integrated flicker signal to provide the flicker signal difference DF.

Step 16 (FIG. 1): by the motion estimation error reduction module 37 (FIG. 2), perform an error reduction on the aligned difference DF and accordingly provide an improved difference DFi. The error reduction may be performed for removing spike noise introduced by error of the motion estimation (step 12), as well as high frequency noise in the difference DF.

With aforementioned alignment in equation eq501, majority of flicker may be recovered in the aligned difference DF by suppressing scene contents, as shown in the example of FIG. 9. However, the aligned difference DF may still suffer some artifacts like noise and unexpected spikes. The spikes are caused by the slight misalignment around the sharp edges of scene contents. To reduce impact from these artifacts, the aligned difference DF may be further cleaned up by the motion estimation error reduction module 36, during step 16. Since spikes may locate at rapid transitions of the aligned difference, the spikes may be detected by identifying rapid transitions, and be removed from the aligned difference DF to form the improved difference DFi. One of such error reductions may be a cubic spline wavelet transform by Mallat and Zhang. For example, a three-stage wavelet decomposition may be applied to the aligned difference DF, and a product of the first and second level wavelet coefficients may be utilized to detect spikes. If a spike is detected, the wavelet coefficients in all three stages may be truncated to zero, and only the approximate coefficients are used in reconstruction. Moreover, since flicker sits in the low frequency range, the first level wavelet coefficients may be completely removed to further reduce high frequency noise, including noise introduced in the intensity compensation.

Along with FIG. 1 to FIG. 5, please refer to FIG. 11 illustrating an example of error reduction at step 16. As shown in FIG. 6, artifacts (e.g., spikes) affecting the aligned difference DF may be effectively suppressed (removed) by error reduction of the motion estimate error reduction module 37, so the resultant improved difference DFi may better demonstrate sinusoidal banding nature of flicker.

Step 18 (FIG. 1): by the flicker feature extraction module 37 and the frequency selection module 38 (FIG. 2), perform a flicker feature extraction which may include: providing a number Z of sample frequencies ft[1] to ft[Z] by the frequency selection module 38, and, by the flicker feature extraction module 37, applying a frequency analysis on a difference (e.g., the improved aligned difference DFi) at Z sample frequencies fs[1] to fs[Z] respectively associated with the sample frequencies ft[1] to ft[Z]. That is, the flicker feature extraction module 37 may analyze frequency components of the difference, based on the sample frequencies ft[1] to ft[Z] selected by the frequency selection module 38, so as to increase the flicker detection fidelity over different image sensor configurations.

Because flicker presents itself as a sinusoidal signal, flicker may be detected by performing frequency analysis on difference of two integrated flicker signals of two frames, so as to extract the frequency components of the difference. For example, flicker may show in two fundamental frequencies, e.g., 100 Hz and 120 Hz, corresponding to the current power line frequency of 50 Hz and 60 Hz, respectively. In an embodiment, rather than performing extensive Fourier transform, such as discrete Fourier transform (DFT), on the difference of Npx elements to obtain Npx frequency components of the entire spectrum, only a handful (much less than the quantity Npx, e.g., nine) frequency components at a handful selected frequencies are required. For example, a spatial frequency fs of the difference may relates to a temporal frequency ft of flicker by:

$$fs = \frac{(\text{line\_width})}{\text{readout\_freq}} \cdot ft \quad (eq601)$$

That is, in flicker feature extraction, the spatial frequency fs is a function of: the readout frequency of the image sensor 30 (FIG. 2), the line width (pixel number per row) of the sensor 30, and the temporal frequency ft in interest. That is, a temporal light fluctuation at a frequency ft will contribute to a spatial fluctuation at the spatial frequency fs which correlates to the frequency ft by equation eq601.

In an implementation embodiment, complex exponential function of frequency analysis may be decomposed into a real part and an imaginary part, and a magnitude square of the frequency component may be adopted as a feature element FT[fs]:

$$FT[fs] = \left(\frac{1}{Nz}\sum_n df[n] \cdot \cos(i \cdot 2\pi \cdot fs \cdot n)\right)^2 + \left(\frac{1}{Nz}\sum_n df[n] \cdot \sin(i \cdot 2\pi \cdot fs \cdot n)\right)^2; \quad (eq602)$$

$$Nz = 2^{\lfloor \log_2(vector\_size) \rfloor}$$

where the term df[n] denotes an n-th element of the difference (e.g., DFi) to be frequency analyzed, the term Nz denotes a normalization factor, with the term vector size equal to number of elements (e.g., Npx) of the difference.

To generate a flicker feature vector, the frequency selection module 38 may select (provide) a number Z of temporal frequencies ft[1] to ft[Z], so same number of feature elements FT[fs[1]] to FT[fs[Z]] at spatial frequencies fs[1] to fs[Z] may be calculated to collectively form the feature vector, wherein the spatial frequencies fs[1] and fs[Z] may be calculated by applying equation eq601 to the temporal frequencies ft[1] to ft[Z] respectively. Among the temporal frequencies ft[1] to ft[Z], two of the temporal frequencies ft[1] to ft[Z] may be 100 Hz and 120 Hz respectively representing the flicker frequencies corresponding to AC power frequencies 50 Hz and 60 Hz, and other frequencies, which may be selected by the frequency selection module 38 based on different sensor settings, may be utilized to remove dependence between frequency components and flicker amplitude. In other words, the feature elements FT[fs[1]] to FT[fs[Z]] may include two feature elements FT[fz120] and FT[fz100] respectively at spatial frequencies fz120 and fz100, wherein the spatial frequencies fz120 corresponds to ft=120 by equation eq601, and the spatial frequencies fz100 corresponds to ft=100 by equation eq601.

The flicker determination module 39 may further derive two normalized flicker feature values X_50 Hz and X_60 Hz which are then used to detect presence of flicker in captured images. The goal of selecting the discrete frequencies ft[1] to ft[Z] is to maximize a separation between conditional distributions of the normalized flicker feature values X_50 Hz and X_60 Hz for flicker-suffered and flicker-free cases:

$$X\_50 \text{ Hz} = \frac{FT[fz120] - \text{mean}120}{\text{mean}120}; \quad \text{(eq603)}$$

where the term mean120 is a mean value of all the feature elements FT[fs[1]] to FT[fs[Z]], except the feature element FT[fz120]. When 50 Hz AE table set is applied, the normalized flicker feature values X_50 Hz may be calculated to indicate if images turn to be exposed under 60 Hz AC powered light.

Similarly, when 60 Hz AE table set is applied, the normalized flicker feature value X_60 Hz may be calculated to inform if images turn to be exposed under 50 Hz AC powered light:

$$X\_60 \text{ Hz} = \frac{FT[fz100] - \text{mean}100}{\text{mean}100}; \quad \text{(eq604)}$$

where the term mean100 is a mean value of all the feature elements FT[fs[1]] to FT[fs[Z]], except the feature element FT[fz100].

One approach for selecting the optimal set of sample frequencies ft[1] to ft[Z] for a new image sensor is to collect integrated flicker signals for flicker-suffered and flicker-free scenes under a variety of lightening conditions. Given a fixed set of sample frequencies, empirical conditional distribution of the normalized flicker feature values may be estimated directly from the empirical data. Then, the optimal set of sample frequencies may be found using a brute-force search over all possible sample frequency sets. However, the approach based on acquiring empirical data for each image sensor is not necessary, since distributions of the normalized flicker feature values may be predicted analytically given a set of frequencies ft[1] to ft[Z], image sensor read-out frequencies and integration configuration of the integral flicker signals.

Figures 12, 13:
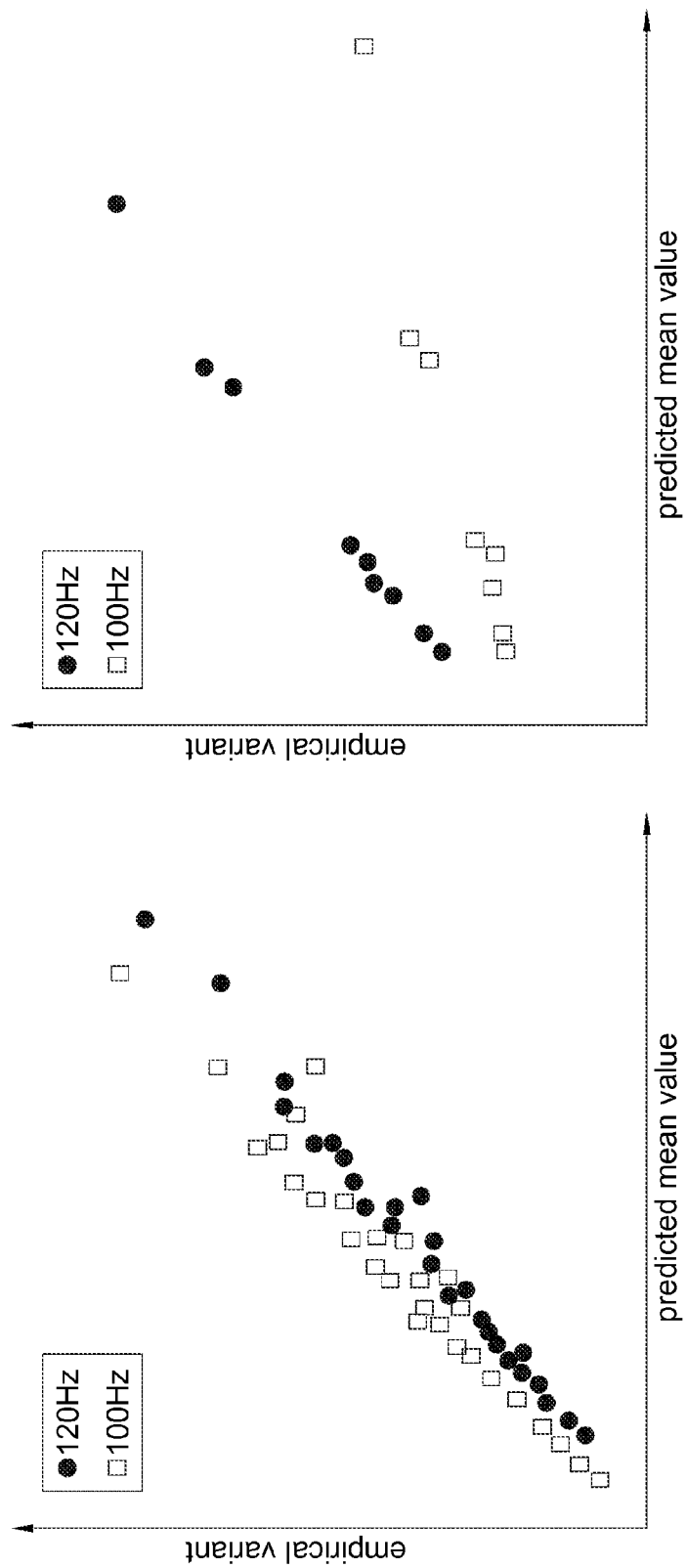
FIG. 12 and FIG. 13 illustrate examples of determining sample frequencies utilized in flicker feature extraction.

Please refer to FIG. 12 and FIG. 13. FIG. 12 illustrates how well a peak of a distribution of the normalized flicker feature values is predicted by the analytical model for an image sensor. It should be noted each data point corresponds to a different set of frequencies ft[1] to ft[Z]. On the other hand, FIG. 13 illustrates a dependence of distribution variance on predicted mean value. Both FIG. 12 and FIG. 13 illustrate the fundamental trade-offs in selecting the optimal set of the frequencies ft[1] to ft[Z]. On one hand, it would be expected that the larger the peak position is, the better the separation between flicker and flicker-free distributions. However, this is counterbalanced by linear dependence of variance on the position of the peak. In addition, as illustrated in FIG. 12, the agreement between theoretical and empirical models starts to break down when the peak position value becomes large.

Integrated flicker signals from a number of image sensors under a variety of capture conditions are collected. By varying the set of the sample frequencies ft[1] to ft[Z], separation between flicker and flicker-free distribution of the normalized flicker feature values may be evaluated. The separation was characterized using information-theoretic criterion using the Kullback-Leibler divergence. Experiments demonstrate that the optimal results are achieved for the predicted peak position close to 3. Based on the above results, the algorithm for selecting the optimal set of sample frequencies ft[1] to ft[Z] is based on a brute force procedure which evaluates each set of sample frequencies in the given search space. The set of sample frequencies ft[1] to ft[Z] which produces the predicted position of the peak closest to 3 is chosen as the optimal set. The optimal set of frequencies ft[1] to ft[Z] may be recorded, and accessed by the frequency selection module 38, so the frequency selection module 38 may provide the frequencies ft[1] to ft[Z] to the flicker feature extraction module 37 according to equations eq601, and the flicker feature extraction module 37 may accordingly compute the normalized flicker feature value X_50 Hz or X_60 Hz by equations eq602, along with eq603 or eq604.

As a brief summary of step 18, step 18 may include:
performing a flicker feature extraction, including:
  applying a frequency analysis on a flicker signal difference DFi at a number Z of sample frequencies fs[1] to fs[Z], as expressed by equation eq602; wherein the frequency analysis is applied to compute Z feature elements FT[fs[1]] to FT[fs[Z]] include a first feature element associated with a flicker frequency to be detected, e.g., the feature element FT[fz120] associated with 120 Hz flicker frequency (equation eq603), or the feature element FT[fz100] associated with 100 Hz flicker frequency (equation eq604); and
  calculating an average over the plurality of feature elements except the first feature elements, e.g., calculating the term mean120 (equation eq603) or mean100 (equation eq604);
  calculating a difference term by subtracting the average from the first feature element, e.g., calculating the difference term (FT[fz120]−mean120) or (FT[fz100]−mean100); and
  calculating a ratio of the difference term and the average term to provide the normalized flicker feature value, e.g., calculating the normalized flicker feature value X_50 Hz as expressed by equation eq603, or calculating the normalized flicker feature value X_60 Hz as expressed by equation eq604.

While the frequency selection module 38 (FIG. 2) may provide the sample frequencies ft[1] to ft[Z] (and therefore the sample frequencies fs[1] too fs[Z]), the sample frequencies are selected to suppress a dependency of the frequency response (e.g., the feature elements FT[fs[1]] to FT[fs[Z]]) on an amplitude of the flicker signal difference (e.g., the difference DFi). The flicker feature extraction module 37 may perform the flicker feature extraction by implementing equation eq602, along with equation eq603 or eq604.

Step 20 (FIG. 1): perform a flicker determination including: by the auto tuning module 40 (FIG. 2), providing a plurality of probability emulation parameters, and, by the flicker determination module 39, determining if flicker of a second flicker frequency happens according to the probability emulation parameters and the normalized featured value(s) obtained at step 18, when an AE table set for a first frequency is applied.

At step 20, a sequential decision algorithm, such as Wald's sequential probability ratio test (SPRT), may be applied to determine the presence of the flicker signal as a hypothesis testing problem. A null hypothesis may correspond to flicker-free illumination under a current AE table set, where the exposure times are designed to compensate the current flicker frequency; on the other hand, an alternative flicker-suffered hypothesis may describe a scenario when light source fluctuates with a flicker frequency different from the flicker frequency that is being compensated for by the current EV table set. In other words, when 50 Hz AE table set is applied, the null hypothesis may correspond to absence of 60 Hz AC powered light, while the alternative hypothesis may correspond to presence of 60 Hz AC powered light.

Let X[i] be an observation at the moment of time, e.g., be the normalized flicker feature value X_50 Hz when 50 Hz AE table set is applied at an i-th frame, or be the normalized flicker feature value X_60 Hz when 60 Hz AE table set is applied at an i-th frame. A log-likelihood ratio may be defined as:

$$\Lambda(X[i]) = \log \frac{p(X[i]|H1)}{p(x[i]|H0)}, \quad \text{(eq701)}$$

where the terms p(X[i]|H0) and p(X[i]|H1) are the conditional probabilities of the observation X[i] under the null and alternative hypotheses H0 and H1. A cumulative log likelihood ratio score S[k] may be further defined as:

$$S[k] = \sum_{i=1}^{k} \Lambda(X[i]). \quad \text{(eq702)}$$

Wald's SPRT decision rule tests the cumulative score against two determination thresholds a0 and a1 to determine whether the null hypothesis should be rejected in favor of the alternative hypothesis:

S[k]>a0: reject H0 in favor of H1, a1≤S[k]≤a0: continue monitoring,

S[k]<a1: do not reject H0. (eq703)

The two determination thresholds a0 and a1 are determined by a desired false positive rate FP and a desired false negative rate FN:

$$a1 = \log \frac{FP}{1 - FN}, \quad \text{(eq704)}$$

$$a0 = \log \frac{1 - FP}{FN}.$$

In order to apply Wald's SPRT to the problem of flicker detection, the conditional probabilities p(X[i]|H0) and p(X[i]|H1) are to be determined under the null (flicker-free) and the alternative (flicker-suffered) hypotheses. Empirical density estimation approach may be applied in order to obtain the conditional probabilities p(X[i]|H0) and p(X[i]|H1) for 50 Hz and 60 Hz AE table sets. The empirical density functions may be modeled by analytical functions, or two-sided analytical functions, such as Gaussian, exponential functions, etc. One example is to model an asymmetric nature of the conditional probability distribution with a two-sided exponential distribution defined as:

$$p(X[i]|H[c]) = \begin{cases} a[c] \cdot \exp\left(\frac{-(X[i]-mu[c])}{Rd[c]}\right); & X[i] \geq mu[c] \\ a[c] \cdot \exp\left(\frac{-(X[i]-mu[c])}{Ld[c]}\right); & X[i] < mu[c] \end{cases}, \quad \text{(eq705)}$$

where the term c may be 0 or 1, so the term H[c] may represent the null hypothesis H0 when c=0, and represent the alternative hypothesis H1 when c=1. The terms Rd[c,f_flk], mu[c,f_flk] and Ld[c,f_flk] (for c=0 and 1), respectively as a right decay rate, a mean and a left decay rate of the conditional probability p(X[i]|H[c]), are probability emulation parameters provided by the auto tuning module 40. The term a[c] may equal Rd[c]*Ld[c]/(Rd[c]+Ld[c]).

Values of the probability emulation parameters Rd[c], mu[c] and Ld[c] may be determined by leveraging both analytical estimates for the peaks of the probability distributions, as well as empirical data collected from a number of image sensors. Frequency responses for flicker-free cases are mainly determined by residual image noise and alignment procedure errors. Therefore, it may be assumed that flicker-free conditional probability p(X[i]|H[0]) (i.e., p(X[i]|H0) may not vary significantly from image sensor to image sensor, and accordingly may be described using a single sensor-independent model. On the other hand, frequency responses for the flicker-suffered case may depend on read-out frequency, integration configuration of the flicker information, as well as the sample frequencies ft[1] to ft[Z] used to compute them at step 18. In order to obtain a model for class-conditional flicker probability distribution p(X[i]|H[1]), generalized flicker feature values XG_50 Hz and XG_60 Hz may be redefined as follows in order to remove dependence on sensor characteristics:

$$XG\_50 \text{ Hz} = \frac{1}{mX\_50 \text{ Hz}} \cdot \frac{FT[fz120] - \text{mean}120}{\text{mean}120}; \quad \text{(eq800)}$$

$$XG\_60 \text{ Hz} = \frac{1}{mX\_60 \text{ Hz}} \cdot \frac{FT[fz100] - \text{mean}100}{\text{mean}100},$$

where the terms mX_50 Hz and mX_60 Hz are estimated peak positions (in histograms of empirical normalized flicker feature values X_50 Hz and X_60 Hz) respectively for 50 Hz and 60 Hz AC powered flicker with frequency responses computed at the discrete set of frequencies ft[1] to ft[Z] (step 18), with the terms FT[fz120], mean120, FT[fz100] and mean100 defined in equations eq603 and eq604. In order to obtain a sensor-independent model, a single distribution of the generalized feature value XG_50 Hz may be fitted to combined data from a collection of image sensors; accordingly, sets of generalized probability emulation parameters (muG50[c],RdG50[c],LdG50[c]) for c=0 and 1 may be obtained and recorded for 50 Hz AE table sets; similarly, a single distribution of the generalized feature value XG_60 Hz may be fitted to combined data from a collection of image sensors, so another sets of generalized probability emulation parameters (muG60[c],RdG60[c], LdG60[c]) for c=0 and 1 may also be obtained and recorded for 60 Hz AE table sets.

Based on the generalized probability emulation parameters, the probability emulation parameters (mu[c],Rd[c],Ld[c]) required in equation eq704 (for c=0 and 1) may be provided by:

$$mu[c]=mX\_50\ Hz \cdot muG50[c],$$

$$Rd[c]=mX\_50Hx \cdot RdG50[c],$$

$$Ld[c]=mX\_50\ Hz \cdot LdG50[c]; \quad (eq801)$$

when 50 Hz AE table set is applied; and be provided by:

$$mu[c]=mX\_60\ Hz \cdot muG60[c],$$

$$Rd[c]=mX\_60Hx \cdot RdG60[c],$$

$$Ld[c]=mX\_60\ Hz \cdot LdG60[c]; \quad (eq802)$$

when 60 Hz AE table set is applied.

In other words, when 50 Hz AE table set is applied, the flicker feature extraction module 37 (FIG. 2) may calculate the normalized flicker feature value X_50 Hz according to equation eq603 at step 18 (FIG. 1). At step 20, the auto tuning module 40 may access the recorded generalized probability parameters (muG50[c],RdG50[c],LdG50[c]) for c=0 and 1, and provide the probability parameters (mu[c], Rd[c],Ld[c]) for c=0 and 1 according to equation eq801; hence, the flicker determination module 39 may:

calculate the conditional probabilities p(X[i]|H[0]) and p(X[i]|H[1]) by equation eq705, calculate the log-likelihood ratio Λ(X[i]) by equation eq701, calculate the score S[k] by equation 702, and determine current exposure by equation 703; e.g., determine that the current exposure is flicker-free if the score S[k] is not greater than the determination threshold a0, otherwise determine that the current exposure is flicker-suffered, so the circuit 200 may transit to 60 Hz AE table set.

Similarly, when 60 Hz AE table set is applied, the flicker feature extraction module 37 may calculate the normalized flicker feature value X_60 Hz according to equation eq604 at step 18. At step 20, the auto tuning module 40 may access the recorded generalized probability emulation parameters (muG60[c],RdG60[c],LdG60[c]) for c=0 and 1, and provide the probability parameters (mu[c],Rd[c],Ld[c]) for c=0 and 1 according to equation eq801; hence, the flicker determination module 39 may:

calculate the conditional probabilities p(X[i]|H[0]) and p(X[i]|H[1]) by equation eq705, calculate the log-likelihood ratio Λ(X[i]) by equation eq701, calculate the score S[k] by equation 702, and determine current exposure by equation 703; e.g., determine that the current exposure is flicker-free if the score S[k] is not greater than the determination threshold a0, otherwise determine that the current exposure is flicker-suffered, so the circuit 200 may transit to 50 Hz AE table set.

In addition to the probability emulation parameters (mu[c],Rd[c],Ld[c]), the auto tuning module 40 may also provide the determination thresholds (a0,a1) required in equation eq703 by equation eq704, with the rate FP and FN given (e.g., set by manufacturer or user). The determination thresholds (a0,a1) and/or the rates (FP,FN) utilized when 50 Hz AE table is applied may be the same as or different from the determination thresholds (a0,a1) and/or the rates (FP,FN) utilized when 60 Hz AE table is applied.

In order to avoid undesirably aligning of power line fluctuations, a robust strategy may be utilized when characterizing flicker by comparing two integrated flicker signals of two consecutive frames. At step 14, besides using a single difference computed based on the aligned (motion compensated) integrated flicker signals, several differences may be calculated in order to alleviate the risk of canceling out flicker pattern during alignment (motion compensation). Among the several differences, a first difference may be computed using motion estimation and compensation described by equation eq501, along with error reduction at step 16; on the other hand, a second difference may be estimated by direct subtraction, without any alignment or motion compensation. All differences may be used in the flicker feature extraction of step 18. The flicker feature extraction module 37 may compute log-likelihood ratio of each difference, and choose the difference which maximizes the log-likelihood ratio over the log-likelihood of other differences, such that the chosen difference is the closest to the alternative hypothesis which corresponds to the presence of flicker. Since each integrated flicker signal may be derived from P regions with P being the number of regions in vertical direction of FIG. 5, the flicker feature extraction module 37 may compute $2^P$ differences, where contributions from each region may be either motion compensated or not. Then the flicker feature extraction module 37 may compute the log-likelihood ratio for each of the $2^P$ differences, and choose the difference has the highest value of the log-likelihood ratio.

For example, similar to data structure the integrated flicker signal S_flk[i] which concatenates P sectional integrated signals Sf[i,1] to Sf[i,P] (FIG. 5), each difference may include Npx elements belongs to P groups; with an n-th element denoted by df[n] for n=1 to Npx, a p-th (for p=1 to P) group may include N[p] elements, and relate to a difference between the sectional integrated signals Sf[i,p] and Sf[i−1,p]. For example, the first N[1] elements df[1] to df[N[1]] may be obtained either by the first N[1] elements of the motion compensated (and error reduced) difference DFi, or by the first N[1] elements of a direct subtraction (Sc_flk[i]−Sc_flk[i]). Similarly, the next N[2] elements df[(N[1]+1)] to df[(N[1]+N[2])] may be obtained either by the next N[2] elements of the motion compensated (and error reduced) difference DFi, or the next N[2] elements of the direct subtraction (Sc_flk[i]−Sc_flk[i]). Because each set of flicker features may include P groups of elements and each group may either be an aligned (motion compensated) subtraction or a direct (unaligned) subtraction, there will be $2^P$ differences, and one of them may be selected by comparing log-likelihood ratios of the $2^P$ differences.

As a brief summary of step 18, step 18 may include: performing a flicker determination, including:

obtaining a first set of probability emulation parameters (e.g., Ld[1], Rd[1] and mu[1]) for modeling a first conditional probability p(X[i]|H[1]) of occurrence of the normalized flicker feature value X[i] under the flicker-suffered hypothesis H[1], as expressed by equation eq705 for c=1;

obtaining a second set of probability emulation parameters (e.g., Ld[0], Rd[0] and mu[0]) for modeling a second conditional probability p(X[i]|H[0]) of occurrence of the normalized flicker feature value X[i] under the flicker-suffered hypothesis H[0], as expressed by equation eq705 for c=0;

calculating a likelihood according to a normalized flicker feature value X[i] (e.g., X_50 Hz or X_60 Hz at an i-th frame), e.g., calculating a logarithm of a ratio between the first conditional probability p(X[i]|H[1]) and the second conditional probability p(X[0]|H[0]) to provide a log likelihood ratio $\Lambda([X[i])$ as the likelihood, as expressed by equation eq701;

accumulating a plurality of the likelihoods, and accordingly providing a score S[k], as expressed by equation eq702;

obtaining determination thresholds a0 and a1 (equation eq703), and according to the score S[k] associated with the likelihood $\Lambda([X[i])$, comparing the score S[k] with the determination thresholds a0 and a1, and accordingly determining whether a flicker-free hypothesis H[0] should be rejected in favor of an alternative flicker-suffered hypothesis H[1], as expressed by equation eq703.

While the auto tuning module 40 may provide the first and second sets required probability emulation parameters along with the determination thresholds, the first conditional probability p(X[i]|H[1]) may be modeled by a two-side exponential distribution as expressed by equation eq705, and the first set of probability emulation parameters may include a left decay rate Ld[1], a right decay rate Rd[1] and a mean mu[1] to characterize the two-side exponential distribution; similarly, the second conditional probability p(X[i]|H[0]) may also be modeled by a second two-side exponential distribution as expressed by equation eq705, and the second set of probability emulation parameters may include a left decay rate Ld[0], a right decay rate Rd[0] and a mean mu[0] to characterize the second two-side exponential distribution. The flicker determination module 39 may perform the flicker determination.

Each module shown in FIG. 2 may be implemented by hardware, by execution circuitry which executes associated firmware and/or software, or by a combination of the aforementioned two.

To sum up, the invention discloses a circuit for flicker detection in a digital image system to account for temporal motion perturbation, including an image sensor, an integrated flicker signal calculation module, a motion estimation module, an intensity compensation module, a motion compensation module, a motion estimation error reduction module, a flicker feature extraction module for frequency analysis, a frequency selection module, a auto tuning module and a flicker determination module. The image sensor may capture image based on a predetermined set of exposure time and frame rate provided by an exposure and frame rate control module. The integrated flicker signal calculation module may gather and calculate integrated flicker signals by integrating pixel data along each row of image. The motion estimator module may perform motion estimation to estimate a translational displacement (offset) between integrated flicker signals of frames. The intensity compensation module may perform intensity compensation on the integrated flicker signals. The motion compensation module may perform motion compensation based on the estimated translational displacement and the intensity compensated result. The motion estimation error reduction module may perform motion error reduction on a difference of two integrated flicker signals to further remove motion estimation error. The frequency selection module may select a set of sample frequencies ft[1] to ft[Z], and the flicker feature extraction module may perform frequency analysis based on the set of sample frequencies ft[1] to ft[Z] to form feature values indicative of characteristics of flicker. The auto tuning module may function as a parameter selection means to provide a plurality of probability emulation parameters for flicker discrimination. The flicker determination module may determine presence of flicker according to the normalized flicker feature values and the probability emulation parameters.

The invention further discloses a method for flicker detection in a digital image system to account for temporal motion perturbation. The method may include: capturing image based on a predetermined set of exposure time and frame rate, integrating pixel data into integrated flicker signals, applying a motion estimation on integrated flicker signals of two consecutive frames to estimate a translational displacement between the two frames, applying an intensity compensation on the integrated flicker signals, applying a motion compensation based on the translational displacement and the intensity compensation result, performing an error reduction on difference of the integrated flicker signals to further remove motion estimation error, selecting a set of sample frequencies for composing a flicker feature, performing a flicker feature extraction by performing a frequency analysis on difference of integrated flicker signals at the set of sample frequencies to form normalized flicker feature values, performing an auto tuning to provide a plurality of probability emulation parameters for flicker determination, and determining presence of flicker according to the normalized flicker feature values and the probability emulation parameters.

Preferably, the invention may maximize flicker signal to noise ratio by frame rate adjustment, gather the integrated flicker signals from images, estimate motion translational offset (displacement) from consecutive frames, compensate estimated motion from the integrated flicker signals, alleviate motion estimation error from the integrated flicker signals, and estimate presence of flicker source from the integrated flicker signals.

While the invention has been described in terms of what is presently considered to be the most practical and preferred embodiments, it should be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for flicker detection based on a plurality of images, comprising:

providing an integrated flicker signal for each image, including: accumulating pixel data of a number of pixels of each image along a direction of each image;

performing an intensity compensating on the integrated flicker signal of each image for alleviating a variation between the images owing to auto exposure, and accordingly providing a compensated integrated flicker signal for each image;

performing a motion compensation, including: comparing two compensated integrated flicker signals of two images, and accordingly providing a flicker signal difference;

performing a flicker feature extraction, including: applying a frequency analysis based on the flicker signal difference, and accordingly providing a normalized flicker feature value; and performing a flicker determination, including: according to the normalized flicker feature value, determining whether a flicker-free hypothesis should be rejected.

2. The method of claim 1 further comprising:

performing a motion estimation on the two compensated integrated flicker signals, including: solving a minimization of a motion error formulated based on a weighted sum of absolute differences of the two compensated integrated flicker signals, and accordingly providing a translational displacement;

wherein comparing the two compensated integrated flicker signals includes:

aligning a first one of the two compensated integrated flicker signals with a second one of the two compensated integrated flicker signals according to the translational displacement, and subtracting the aligned first compensated integrated flicker signal with the second compensated integrated flicker signal to provide the flicker signal difference.

3. The method of claim 2, wherein each compensated integrated flicker signal includes a plurality of elements respectively associated with a plurality of locations on each image, and solving the minimization of the motion error includes:

calculating a window at each location according to spatial flatness of each compensated integrated flicker signal at each location; and weighting a sum of absolute differences of the two compensated integrated flicker signals by the window for formulating the motion error.

4. The method of claim 3, wherein solving the minimization of the motion error further includes:

solving the minimization of the motion error at a low-resolution, and then solving the minimization of the motion error at a high-resolution.

5. The method of claim 3, wherein aligning the first compensated integrated flicker signal with the second compensated integrated flicker signal includes:

selectively aligning each element of the first compensated integrated flicker signal according to the window at each location associated with each element.

6. The method of claim 1 further comprising:

providing an exposure time according to maximizing, at a flicker frequency, a frequency response of exposure, and causing each image to be exposed with the exposure time.

7. The method of claim 1 further comprising:

providing a frame rate according to maximization of an amplitude difference between a fluctuation waveform and a delayed fluctuation waveform which is delayed by a phase shift associated to an interval between the two images; and causing the plurality of images to be captured at the frame rate.

8. The method of claim 1, wherein providing the integrated flicker signal for each image further includes:

categorizing each row of each image to a plurality of row sections, grouping a plurality of subsets of the plurality of row sections to a plurality of regions, respectively;

providing a plurality regional signals respectively associated with the plurality regions, wherein accumulating pixel data of a number of pixels of each image along the direction of each image is accumulating pixel data of each pixel in each row section of each region to provide an element of each regional signal;

among the regional signals which associate with row sections belonging to same rows, selecting one as a sectional integrated signal; and concatenating a plurality of sectional integrated signals to form the integrated flicker signal.

9. The method of claim 1, wherein the frequency analysis is applied at a number of sample frequencies, the flicker signal difference includes a first number of elements, and the first number is greater than the number of sample frequencies.

10. The method of claim 1, wherein the frequency analysis is applied to compute a frequency response at a number of sample frequencies, and the sample frequencies are selected to suppress a dependency of the frequency response on an amplitude of the flicker signal difference.

11. The method of claim 1, wherein the frequency analysis is applied to compute a plurality of feature elements which include a first feature element associated with a flicker frequency to be detected, and performing the flicker feature extraction further includes:

calculating an average over the plurality of feature elements except the first feature elements, calculating a difference term by subtracting the average from the first feature element, and calculating a ratio of the difference term and the average term to accordingly provide the normalized flicker feature value.

12. The method of claim 1 further comprising:

performing an intensity modulation on the integrated flicker signal of each image for reducing noise induced by an image sensor by which the images are captured.

13. The method of claim 1, wherein performing the flicker determination further includes:

calculating a likelihood according to the normalized flicker feature value, accumulating a plurality of the likelihoods, and accordingly providing a score;

obtaining a determination threshold, and comparing the score with the determination threshold to determine whether the flicker-free hypothesis should be rejected in favor of the alternative flicker-suffered hypothesis.

14. The method of claim 1, wherein performing the flicker determination further includes:

obtaining a first set of probability emulation parameters for modeling a first conditional probability of occurrence of the normalized flicker feature value under a flicker-suffered hypothesis, obtaining a second set of probability emulation parameters for modeling a second conditional probability of occurrence of the normalized flicker feature value under the flicker-free hypothesis, calculating a logarithm of a ratio between the first conditional probability and the second conditional probability to provide a likelihood, and according to the likelihood, determining whether the flicker-free hypothesis should be rejected in favor of the flicker-suffered hypothesis.

15. The method of claim 14, wherein the first conditional probability is modeled by a two-side exponential distribution, and the first set of probability emulation parameters includes a left decay rate, a right decay rate and a mean to characterize the two-side exponential distribution.

16. The method of claim 1 further comprising:
performing an error reduction on the flicker signal difference for removing spike noise introduced by error of the motion estimation, as well as high frequency noise in the flicker signal difference.

17. The method of claim 1, wherein the pixel data of each pixel is a green channel intensity of each pixel.

18. A circuit for flicker detection based on a plurality of images, comprising:
an integrated flicker signal calculation module for providing an integrated flicker signal for each image, including: accumulating pixel data of a number of pixels of each image along a direction of each image;
an intensity compensation module for performing an intensity compensating on the integrated flicker signal of each image for alleviating a variation between the images owing to auto exposure, and accordingly providing a compensated integrated flicker signal for each image;
a motion compensation module for performing a motion compensation, including: comparing two compensated integrated flicker signals of two images, and accordingly providing a flicker signal difference;
a flicker feature extraction module for performing a flicker feature extraction, including: applying a frequency analysis based on the flicker signal difference, and accordingly providing a normalized flicker feature value; and
a flicker determination module for performing a flicker determination, including: according to the normalized flicker feature value, determining whether a flicker-free hypothesis should be rejected.

19. The circuit of claim 18 further comprising:
a motion estimation module for performing a motion estimation on the two compensated integrated flicker signals, including: solving a minimization of a motion error formulated based on a weighted sum of absolute differences of the two compensated integrated flicker signals, and accordingly providing a translational displacement;
wherein the motion compensation module is arranged to compare the two compensated integrated flicker signals by:
aligning a first one of the two compensated integrated flicker signal with a second one of the two compensated integrated flicker signal according to the translational displacement, and subtracting the aligned first compensated integrated flicker signal with the second compensated integrated flicker signal to provide the flicker signal difference.

20. The circuit of claim 18 further comprising:
an exposure and frame rate control module for:
providing a frame rate according to maximization of an amplitude difference between a fluctuation waveform and a delayed fluctuation waveform which is delayed by a phase shift associated to an interval between the two images;
providing an exposure time according to maximization of a frequency response of exposure at a flicker frequency, and
causing the plurality of images to be captured at the frame rate, and each image to be exposed with the exposure time.

21. The circuit of claim 18 further comprising:
a frequency selection module for providing a number of sample frequencies; wherein the frequency analysis is applied to compute a frequency response at the number of sample frequencies, and the sample frequencies are selected to suppress a dependency of the frequency response on an amplitude of the flicker signal difference.

22. The circuit of claim 18, where the integrated flicker signal calculation further performs an intensity modulation on the integrated flicker signal of each image for reducing noise induced by an image sensor by which the images are captured.

23. The circuit of claim 18, wherein the flicker determination further includes:
obtaining a first set of probability emulation parameters for modeling a first conditional probability of occurrence of the normalized flicker feature value under a flicker-suffered hypothesis,
obtaining a second set of probability emulation parameters for modeling a second conditional probability of occurrence of the normalized flicker feature value under the flicker-free hypothesis,
calculating a logarithm of a ratio between the first conditional probability and the second conditional probability to provide a likelihood, and
according to the likelihood, determining whether the flicker-free hypothesis should be rejected in favor of the flicker-suffered hypothesis;
and the circuit further comprising:
an auto tuning module for providing the first set of probability emulation parameters and the second set of probability emulation parameters.

24. The circuit of claim 18 further comprising:
a motion estimation error reduction module for: performing an error reduction on the flicker signal difference for removing spike noise introduced by error of the motion estimation, as well as high frequency noise in the flicker signal difference.

* * * * *